(12) United States Patent
Mahalle et al.

(10) Patent No.: US 10,902,150 B2
(45) Date of Patent: Jan. 26, 2021

(54) METHODS AND SYSTEMS FOR FACILITATING MIGRATION TO CENTRALIZED COMPLIANCE CONTENT FOR INTEGRATION WITH A PLURALITY OF DIGITAL APPLICATIONS

(71) Applicant: MASTERCARD INTERNATIONAL INCORPORATED, Purchase, NY (US)

(72) Inventors: Rajesh Pralhadrao Mahalle, Pune (IN); Ankit Kumar Binnani, Pune (IN); Thrilok Lingappa Kotian, Bangalore (IN)

(73) Assignee: Mastercard International Incorporated, Purchase, NY (US)

( * ) Notice: Subject to any disclaimer, the term of this patent is extended or adjusted under 35 U.S.C. 154(b) by 108 days.

(21) Appl. No.: 16/209,496

(22) Filed: Dec. 4, 2018

(65) Prior Publication Data
US 2020/0050787 A1 Feb. 13, 2020

(30) Foreign Application Priority Data
Aug. 13, 2018 (SG) .............................. 10201806847P

(51) Int. Cl.
*G06F 21/62* (2013.01)
*G06F 16/23* (2019.01)
(Continued)

(52) U.S. Cl.
CPC ............ *G06F 21/6245* (2013.01); *G06F 9/54* (2013.01); *G06F 16/2379* (2019.01); *G06F 16/252* (2019.01)

(58) Field of Classification Search
CPC ............ G06F 21/6245; G06F 16/2379; G06F 16/252; G06F 9/54
See application file for complete search history.

(56) References Cited

U.S. PATENT DOCUMENTS 9,639,696 B1\* 5/2017 Nagaralu .................. G06F 8/61
10,417,401 B2\* 9/2019 Votaw ................ G06Q 20/3224
(Continued)

OTHER PUBLICATIONS

"Easily Collect GDPR Consent and Document Opt-Ins for Your Web Forms"—IUBENDA, May 2016 https://www.iubenda.com/en/consent-solution (Year: 2016).\*
(Continued)

*Primary Examiner* — Randy A Scott
(74) *Attorney, Agent, or Firm* — Loza & Loza, LLP

(57) ABSTRACT

In an embodiment, a method includes accessing one or more digital applications by a server system. Each of the one or more digital applications is configured to be accessed by a plurality of users. The method also includes determining, by the server system, compliance content in each of the one or more digital applications. The method further includes removing the compliance content determined from each of the one or more digital applications. The method further includes storing the compliance content in a central repository. Thereafter, the method includes facilitating integration of one or more widgets into each of the one or more digital applications to access the compliance content stored in the central repository. The one or more widgets integrated into a digital application of the one or more digital applications enable a user of the digital application to access the compliance content from the central repository.

20 Claims, 14 Drawing Sheets

(51) Int. Cl.
G06F 16/25 (2019.01)
G06F 9/54 (2006.01)

(56) References Cited

U.S. PATENT DOCUMENTS

2003/0233330 A1    12/2003  Raley et al. .................... 705/55
2013/0185807 A1*   7/2013   Rodriguez ............. G06F 21/10
                                                            726/28
2018/0255106 A1*   9/2018   Wiesmaier ............ H04W 12/02

OTHER PUBLICATIONS

Anonymous: "Automatic Extraction of Metadata Values from File Properties FileHold", May 3, 2016; https://www.filehold.com/help/library/file-properties-extraction-rules; 7 pgs.

Anonymous: "Automatic Extraction of XML Content Controls from Microsoft Word Content Controls FileHold"; http://www.fiehold.com/help/library/xml-nodes-extraction-rules; 11 pgs.

* cited by examiner

| IDENTIFIERS | TAGS |
|---|---|
| SERVICE CODE | PC |
| SERVICE FUNCTION CODE | PC-REG |
| USE CATEGORY CODE | ToU |
| CONTENT TYPE CODE | LC |
| LOCALE CODE | EN-AU |

FIG. 5

METHODS AND SYSTEMS FOR FACILITATING MIGRATION TO CENTRALIZED COMPLIANCE CONTENT FOR INTEGRATION WITH A PLURALITY OF DIGITAL APPLICATIONS

CROSS-REFERENCE TO RELATED APPLICATION

This application claims the benefit of and priority to Singapore Patent Application No. 10201806847P, filed Aug. 13, 2018. The entire disclosure of the above application is incorporated herein by reference.

FIELD

The present disclosure generally relates to data or information management and, more particularly to, methods and systems for managing compliance content related to digital applications associated with organizations.

BACKGROUND

This section provides background information related to the present disclosure which is not necessarily prior art.

Users electronically interact with entities (e.g., businesses, organizations, enterprises, e-commerce companies, government agencies, etc.) for performing online financial transactions, browsing of products/services, gathering information, social networking, and the like, through online means, such as mobile or web applications, websites of these entities, etc. During the process of electronically interacting with the entities, users oftentimes share their personal data, and agree to various terms and conditions, before actually using an online interface offered by the entities. It is generally the responsibility of the entities to protect their users' information from unauthorized sources and prevent the information from being misused. Entities also aim to utilize and share with other entities the information thus obtained for generation of customer-specific contents/advertisements to promote their businesses. Hence, the online interface of the entities displays a consent page showing privacy terms and conditions to which the users are required to provide their consents to a usage of their information by the entities. Currently, a majority of the web platforms are configured such that for the customer to be able to use the web platforms, agreeing to the privacy terms and conditions provided by the web platforms is a must.

In today's scenario, a customer's political interests, racial data, biometric data, etc., may be used against the customer. Lack of trust in how entities may treat their information has led customers to take their own countermeasures, such as intentionally providing incorrect data when signing up for services online. In many instances, customers boycott an entity that appears to disregard the protection of their data, which is a huge loss to entities and their businesses. In order to mitigate data misuse along with other objectives, such as integrating legal language and consent language of the online interface of the entities at a common storage location, European Union (EU) has implemented a General Data Protection Regulation (GDPR). The GDPR aims to provide control to the customers over their personal data. The GDPR extends protection to basic identity information, such as name, address, location, IP address, cookie data, health and genetic data, biometric data, racial or ethnic data, political opinions and sexual orientation, among other things.

With the implementation of GDPR, it has become important for all entities to migrate their consent language texts, legal content, privacy terms and conditions language, to a readily accessible location to make the entities compliant with the GDPR. Typically, an entity may have several businesses, products or services, spread across the world and each business, product or service may have its own web platform. Moreover, various web platforms, based on multiple technologies, have their own consent language page(s) and privacy terms and conditions page(s) in multiple languages. Therefore, it becomes cumbersome for the entities to manually migrate the existing consent language, legal content, privacy terms and conditions, or similar content, to the readily accessible location to make them GDPR compliant. Such a task involves an enormous amount of money and manual effort. Hence, complying with all of the standards, rules, laws, regulations, and guidelines of the GDPR regulation, or of similar regulations, in EU regions or in other parts of the world for entities is a cumbersome process.

Hence, in light of the foregoing discussion, one or more techniques are needed that can obviate the challenges faced by the entities in adhering to the GDPR, or similar regulations or compliances in EU or in other regions of the world.

SUMMARY

This section provides a general summary of the disclosure, and is not a comprehensive disclosure of its full scope or all of its features. Aspects and embodiments of the disclosure are set out in the accompanying claims.

To address the concerns inherent in the conventional techniques and to achieve the objectives mentioned in the background section, a technical effect of the present disclosure is automatically removing compliance content (e.g., content related to GDPR compliance) from digital applications, storing the compliance content at a central repository, and making the compliance content readily available to the users of the digital applications by integrating widgets into user interfaces of the digital applications. Various example embodiments of the present disclosure provide methods, systems, user devices and computer program products for facilitating migration to centralized compliance content for integration with a plurality of digital applications. Various embodiments further provide a framework facilitated by a server system that facilitates storage of compliance content in the central repository and facilitates access to the compliance content to the digital applications from the central repository by integrating one or more widgets into the plurality of digital applications.

In an embodiment, a method for facilitating migration to centralized compliance content for integration with digital applications is disclosed. The method includes accessing one or more digital applications by a server system. Each of the one or more digital applications is configured to be accessed by a plurality of users. The method includes determining, by the server system, compliance content in each of the one or more digital applications. The method further includes removing the compliance content determined from each of the one or more digital applications. The method further includes storing the compliance content removed from each of the one or more digital applications in a central repository. Thereafter, the method includes facilitating integration of one or more widgets into each of the one or more digital applications to access the compliance content stored in the central repository. The one or more widgets is integrated into a digital application of the one or more digital applications such that upon selection of a widget, it enables a user of the digital application to access the compliance content from the central repository.

In another embodiment, a server system for facilitating migration to centralized compliance content for integration with digital applications is disclosed. The server system includes a memory comprising stored instructions and a processor configured to execute the stored instructions. The server system is caused to perform accessing one or more digital applications, each of the one or more digital applications is configured to be accessed by a plurality of users. The server system is further caused to perform determining compliance content in each of the one or more digital applications. The server system is further caused to perform removing the compliance content determined from each of the one or more digital applications. The server system is further caused to storing the compliance content removed from each of the one or more digital applications in a central repository. The server system is further caused to facilitating integration of a widget into each of the one or more digital applications to access the compliance content stored in the central repository. The widget, integrated into a digital application of the one or more digital applications, enables a user of the digital application to access the compliance content from the central repository.

In another embodiment, a framework in a server system for facilitating migration to centralized compliance content for integration with digital applications is disclosed. The framework in the server system includes a communication interface configured to access one or more digital applications. The framework in the server system also includes a reader and extractor module configured to determine compliance content in each of the one or more digital applications. The reader and extractor module are also configured to remove the compliance content determined from each of the one or more digital applications. The framework in the server system further includes an integration module configured to facilitate storage of the compliance content removed from each of the one or more digital applications in a central repository. The integration module is also configured to facilitate integration of a widget into each of the one or more digital applications to access the compliance content stored in the central repository. The widget integrated into a digital application of the one or more digital applications enables a user of the digital application to access the compliance content removed from the digital application from the central repository.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In connection therewith, and for a more complete understanding of example embodiments of the present technology, reference is now made to the following descriptions taken in connection with the accompanying drawings in which:

FIG. 5 is an example representation of a table including tags used for migration of compliance content of the digital application to the central repository, in accordance with an example embodiment of present disclosure;

Figure 8:
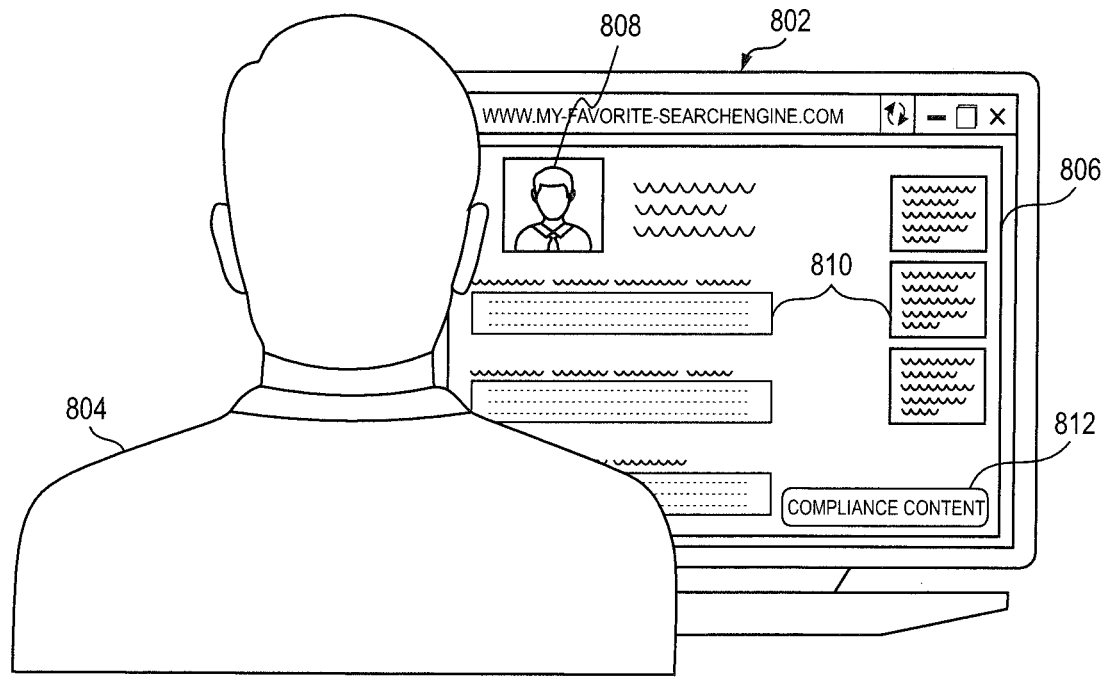
FIG. 8 is a simplified schematic representation of the digital application as viewed on a user device, in accordance with an example embodiment of the present disclosure.
Figure 14:
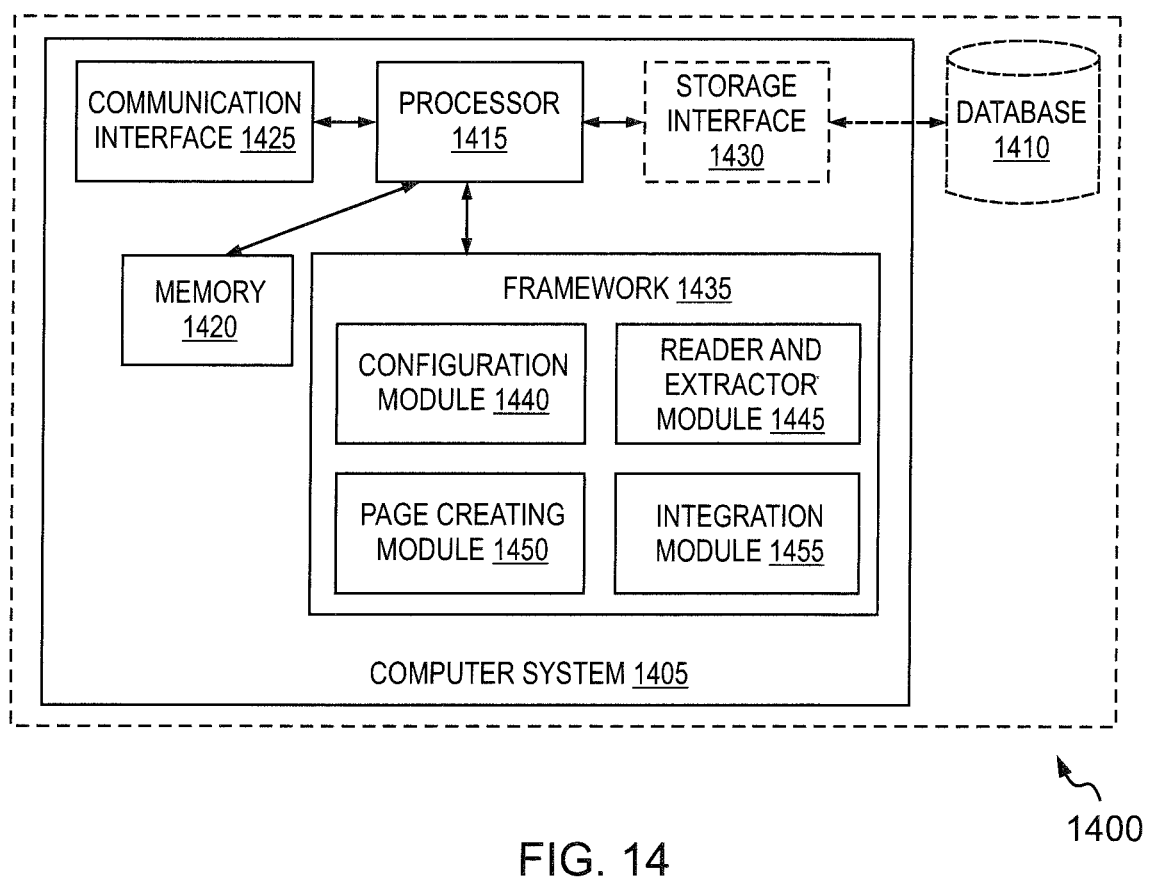
Figure 15:
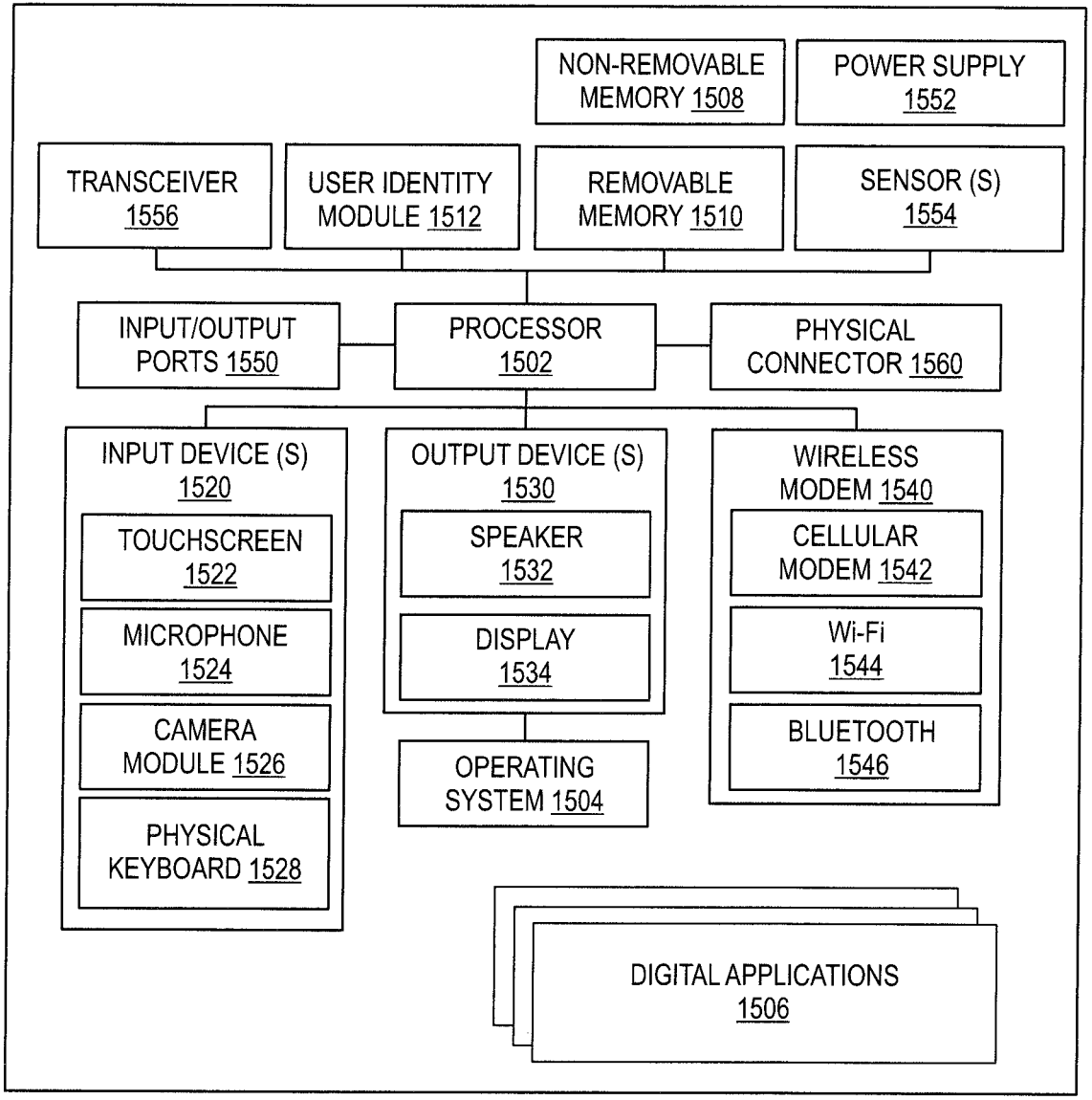

FIG. 14 is a simplified block diagram of a server system used for facilitating migration to centralized compliance content for integration with a plurality of digital applications, in accordance with one embodiment of the present disclosure; and FIG. 15 shows a simplified block diagram of a user device, such as the user device seen in FIG. 8, in accordance with one embodiment of the present disclosure.

The drawings referred to in this description are not to be understood as being drawn to scale except if specifically noted, and such drawings are only exemplary in nature. Corresponding reference numerals indicate corresponding parts throughout the several views of the drawings.

DETAILED DESCRIPTION

The description and specific examples included herein are intended for purposes of illustration only and are not intended to limit the scope of the present disclosure. In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "GDPR", used throughout the description, refers to General Data Protection Regulation, as promulgated by the European Union (EU). GDPR is a regulation in EU law on data protection and privacy for all individuals within the EU region and the European Economic Area (EEA).

The term "compliance content", used throughout the description, refers to any content that may be defined as compliance content under any regulation or compliance requirements. For example, legal content and consent language-related content can be examples of the compliance content. Some non-exhaustive examples of the legal content include terms and conditions, terms of use, content related to confidentiality, legal declarations, intellectual property related content, warranty related content, ownership related content, indemnity, undertaking and agreement. Examples of the consent language-related content includes texts indicating user's acceptance of certain terms and conditions, any voting by users and/or record of user's opinion, etc. It is also to be noted that the scope and definition of "compliance content" can change with time as per the changes in the regulations and compliances, such as GDPR.

The term "widget" used throughout the description, refers to electronic icons, pull-down menus, buttons, selection boxes, progress indicators, on-off checkmarks, scroll bars, windows, window edges, toggle buttons, and any other components for displaying information and for accepting user actions and responding to user actions in a computing device or an electronic device.

Various example embodiments of the present disclosure provide methods, systems, and computer program products for facilitating migration to centralized compliance content for integration with a plurality of digital applications of an organization. Various example embodiments further provide a framework facilitated by a server system that facilitates automatic storage of compliance content of digital applications in a central repository. Further, the framework facilitates access to the compliance content from the central repository by integrating a component/widget in a user interface of each of the plurality of digital applications.

The digital applications may not be limited to only mobile or web applications, but also include, any form of information sharing interface between the organization and users, such as websites, web portals, cloud applications, streaming channels, or any other interaction channel through which a user/customer can interact with the organization. The digital applications may be managed and hosted by corresponding application servers and can be accessed by users via user devices, such as mobile phones, desktop computers, or any electronic device with communication capabilities. In some scenarios, the digital applications can be made available from an application store, such as Google Playstore managed by Google®, Apple App store managed by Apple®, etc., and are downloadable from the application stores to be accessed on user devices.

The server system, via the framework, accesses the digital applications associated with the organization. Further, the framework identifies pages of the digital applications that contain compliance content including, but not limited to, legal content and consent language texts present in the digital applications. The framework is configured to remove the compliance content from the pages of the digital applications and to store the compliance content removed from the pages of the digital applications to a central repository. The central repository is GDPR compliant and acts as a GDPR compliant management system.

For migrating the compliance content from a digital application to the central repository, the framework configures tags (or metadata) using identifiers present in the compliance content. The identifiers signify a type of service or business and their attributes offered by the digital application. In a non-limiting example, the identifiers indicate at least a service code, a use category code, a content type and a locality data, among others, related to the digital application. The framework then creates a template (e.g., a directory of pages) based on the tags arranged in a hierarchical manner. The framework further populates the template with the compliance content removed from the pages of the digital application. The directory of pages, including the compliance content and the tags, are then migrated to the central repository. The server system, via the framework, facilitates the integration of a widget into the user interface (UI) of digital application, where the widget enables accessing of the compliance content stored in the central repository. For instance, when a user of the digital application wishes to access the compliance content stored in the central repository, the user may select the widget integrated with the digital application. In at least one embodiment, upon selection of the widget integrated with the digital application, the digital application displays compliance content to the user in the UI of the digital application.

Various example embodiments of the present disclosure are described by taking example of the GDPR compliance. However, teachings of the present disclosure can also apply in relation to other regulations and compliance requirements, such as, including but not limited to, Markets in Financial Instruments Directive (MiFID), Payment Card Industry Data Security Standard (PCI DSS), Federal Information Security Management Act (FISMA), Gramm-Leach-Bliley Act (GLBA), U.S.'s Health Insurance Portability and Accountability Act (HIPPA), Sarbanes—Oxley Act (SOX), and the like.

Figure 1:
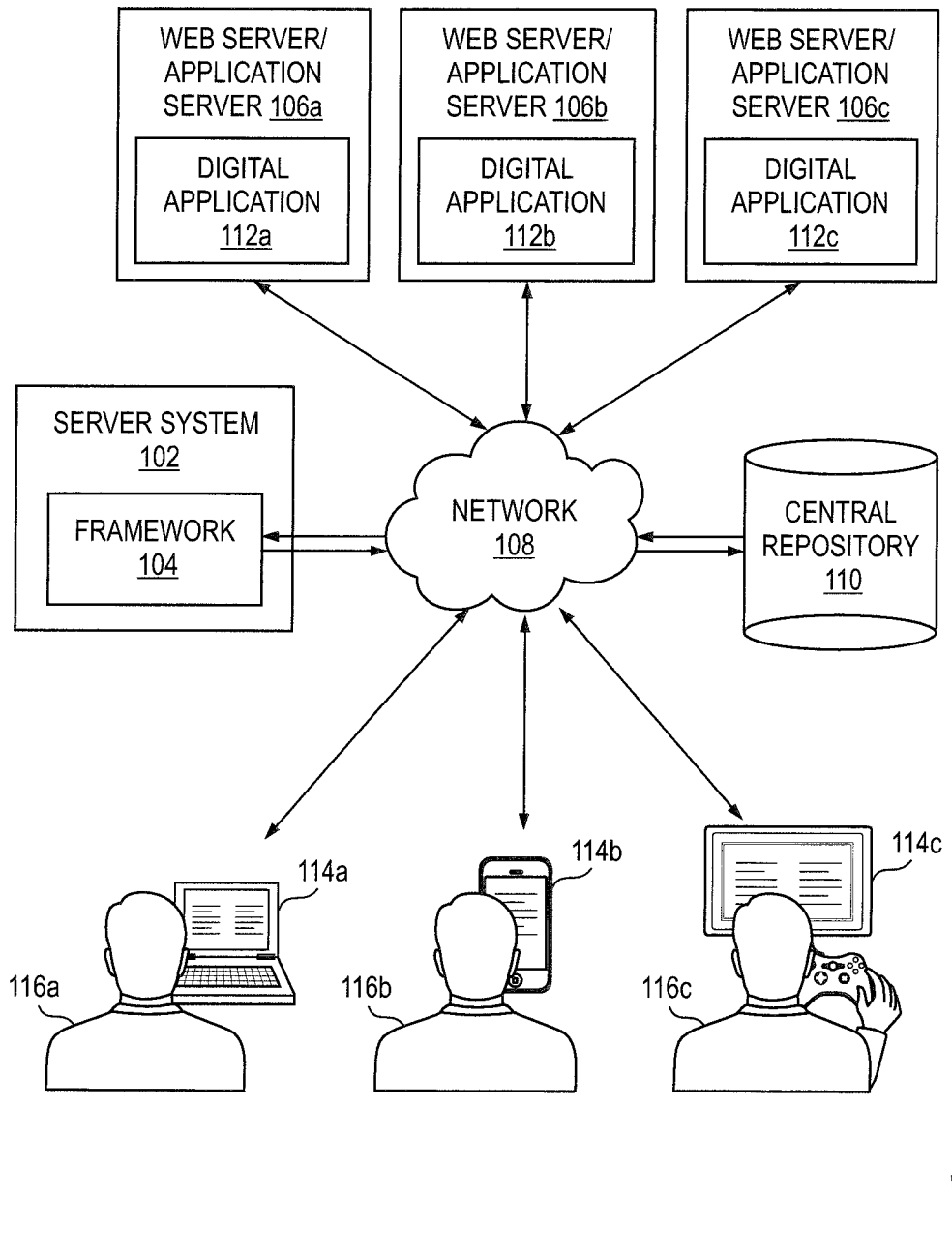
FIG. 1 illustrates an example representation of an environment, in which at least some example embodiments of the present disclosure can be implemented.

FIG. 1 illustrates an example representation of an environment 100, in which at least some example embodiments of the present disclosure can be implemented. In the illustrated embodiment, the environment 100 is depicted as including a server system 102 which facilitates a framework 104 and is in operative communication with one or more servers associated with one or more digital applications via a network 108. For instance, the server system 102 is exemplarily shown to be connected with web server/application servers 106a, 106b, 106c. Only three web server/application servers 106a, 106b, 106c are shown for the example purposes only, and it should be noted that in actual use case scenarios, there may be any number of such servers. The web server/application servers 106a, 106b, 106c (hereinafter also referred to as an 'application server') may be associated with an entity, an enterprise or an organization, for example, Mastercard® International Incorporated (Mastercard® is a registered trademark of Mastercard® International Incorporated located in Purchase, N.Y.). Each of the application servers 106a, 106b, 106c may have one or more servers to carry out the functions of the application servers 106a, 106b, 106c. Some non-exhaustive examples of the application servers 106a, 106b, 106c are Masterpass® digital wallet application server, Mastercard® IDENTITY CHECK™ mobile application server, Priceless Cities® platform server, Vocalink™ payment server, Mastercard® Meetings, and Mastercard Nearby® mobile application server provided by Mastercard® International Incorporated. The application servers 106a, 106b, 106c may be centralized or cloud-based servers.

Each of the application servers 106a, 106b, 106c may facilitate digital applications of a variety of forms and configurations to the users. For example, the application server 106a is shown to manage and host a digital application 112a, the application server 106b is shown to manage and host a digital application 112b, and the application server 106c is shown to manage and host a digital application 112c. As an example, the digital applications 112a-112c may be accessed by any type of digital interface or an interaction channel by the users. For instance, the digital applications 112a-112c can be accessed via channels, including, but not limited to, web applications, mobile applications, websites, web portals, web pages, cloud applications, streaming channels, and storage applications. In an example, an application server related to an e-commerce enterprise may offer web portal and/or a mobile application through which the users can access the listed products/services offered by the e-commerce enterprise and can make any financial transaction for purchasing the products or for availing the services. In some cases, the digital application can be a webpage related to a social media platform. In some cases, the digital application can be an information providing platform, such as a website for providing news, lectures, etc.

The digital applications 112a-112c are accessible on user devices, such as mobile phones, computers, personal digital assistants, or any portable or fixed electronic devices with communication capability. The application servers 106a-106c manage the corresponding digital applications 112a-112c, respectively, such that API and other components of the digital applications 112a-112c rest on the application servers 106a-106c, respectively. The digital applications 112a-112c can be made available at application stores for mobile apps, web apps, or can be accessed from any storage location. Examples of the application stores for mobiles applications include, but not limited to, Google Playstore managed by Google®, iOS App store managed by Apple®, Amazon® app store, etc. Examples of web application stores include, but are not limited to, Chrome store managed by Google®, iTunes®, cloud-based application stores, etc. The digital applications 112a-112c can also be directly downloadable from the web links or from the application servers 106a-106c for accessing on user devices, such as desktop computers, smart phones, tablets, notebooks, etc. Upon download, a set of computer executable codes associated with the digital applications 112a-112c may be stored in a non-transitory computer-readable medium of user devices. Typically, upon installation of the digital applications 112a-112c on a user device, an application interface is facilitated on the user device for accessing the digital applications 112a-112c.

In use, the digital applications 112a-112c retrieve one or more pages from the corresponding application servers 106a-106c over the network 108 and display the pages on user devices (see, 114a, 114b, 114c) of the users (see, 116a, 116b, 116c). In many scenarios, the digital applications 112a-112c can include the compliance content among a variety of content presented to the user devices 114a-114c. Examples of the compliance content include, but not limited to, legal content or consent language related content. Examples of the legal content include, but not limited to, content related to or classified as private information of the users, content related to confidentiality, legal declarations, indemnity and intellectual property related content. Examples of the consent related content include any consent provided by the user to terms and conditions associated with the digital applications 112a-112c. For instance, when a user creates a new profile or registers with the digital applications 112a-112c, the user may be offered with a legal document to read upon and various terms and conditions on which the consent of the user is sought before providing access of the digital applications 112a-112c to the user. The compliance content can be categorized with one or more tags, such as content type (consent language or privacy data), service/product code (identifier of service/product), service/product function code (registration and authentication information), country or locale data, etc.

The environment 100 includes a central repository 110 which can be a storage server/system, such as physical storage unit (s) and/or a virtual server/cloud-based server. For instance, the central repository 110 is any storage system capable of providing an external system with access to the information stored within the storage unit via a storage interface. Some examples of the storage interface include, but not limited to, an Advanced Technology Attachment (ATA) adapter, a Serial ATA (SATA) adapter, a Small Computer System Interface (SCSI) adapter, a RAID controller, a SAN adapter, a network adapter, and/or any component known, used or to be developed. In a non-limiting example, the external systems, such as the application servers 106a-106c, can make API calls to the central repository 110 to access the content available at the central repository 110.

In at least one embodiment, the framework 104 provided by the server system 102 enables migration of the compliance content from the digital applications 112a-112c to the central repository 110 from where the compliance content can be readily accessed by users of the digital applications 112a-112c. The framework 104 may be one or more software components including various sets of programs and instructions that define how each set of programs within the framework 104 interrelate. The framework 104 may include actual programs, programming interfaces, or programming tools for enabling workflow of the framework 104. The framework 104 may include one or more modules or components which are explained in detail with reference to FIGS. 9 and 10.

The framework 104 is configured to identify the compliance content from the digital applications 112a-112c, remove the identified compliance content, and facilitate storage of the removed compliance content at the central repository 110. The framework 104 facilitates a component, such as a widget, to be displayed symbolically at the UIs associated with the digital applications 112a-112c. When a user, for example, the user 116a, accesses a digital application, for example, the digital application 112a on his user device 114a, a widget (best shown in FIG. 8) is shown to the user 116a while accessing the digital application 112a on the user device 114a. More specifically, the digital application 112a displays the widget to enable API based communication with the central repository 110 for accessing the compliance content of the digital application 112a stored in the central repository 110.

The central repository 110 may include multiple databases, where each database corresponds to storing the compliance content associated with a digital application from among the digital applications 112a-112c. In at least one example embodiment, even for one digital application, compliance content may be stored in more than one database in the central repository 110. For instance, legal content for a digital application, such as the digital application 112a, can be stored in one database, and consent language related text of the digital application 112a can be stored in another database within the central repository 110.

In some examples, the server system 102, the application servers 106a-106c and the central repository 110 may be hosted and managed by a single organization/enterprise. As an example, the server system 102 and the central repository 110 may be hosted and managed by a payment cards issuing authority or a payment interchange network, such as Mastercard® payment system interchange network offered by Mastercard® International Incorporated, and the application servers 106a-106c may relate to various products/services offered by Mastercard® International Incorporated. In other examples, the server system 102, the application servers 106a-106c, and the central repository 110 may be managed by different organizations. For instance, the application servers 106a-106c may relate to entities such as an acquirer bank and/or an issuer bank, whereas the server system 102 and the central repository 110 may be managed by the payment interchange network such as Mastercard® payment system interchange network.

The application servers 106a-106c and the server system 102 can be examples of logical servers built on a cloud computing platform. Alternatively, the application servers 106a-106c and the server system 102 can be a physical server located at facilities of entities managing these servers.

The server system 102, the application servers 106a-106c, the central repository 110, and the user devices 114a-114c may communicate with one another via the network 108. The network 108 may be a centralized network or may comprise a plurality of sub-networks that may offer a direct communication or may offer indirect communication between the server system 102, the application servers 106a-106c, the central repository 110 and the user devices 114a-114c. Examples of the network 108 may include any type of wired network, wireless network, or a combination of wired and wireless networks. A wireless network may be a wireless local area network ("WLAN"), a wireless wide area network ("WWAN"), or any other type of wireless network now known or later developed. Additionally, the network 108 may be or include the Internet, intranets, extranets, microwave networks, satellite communications, cellular systems, personal communication services ("PCS"), infrared communications, global area networks, or other suitable networks, etc., or any combination of two or more such networks.

Some example embodiments of the present disclosure are herein explained with reference to FIGS. 2A-2B to 15.

Figure 2A:
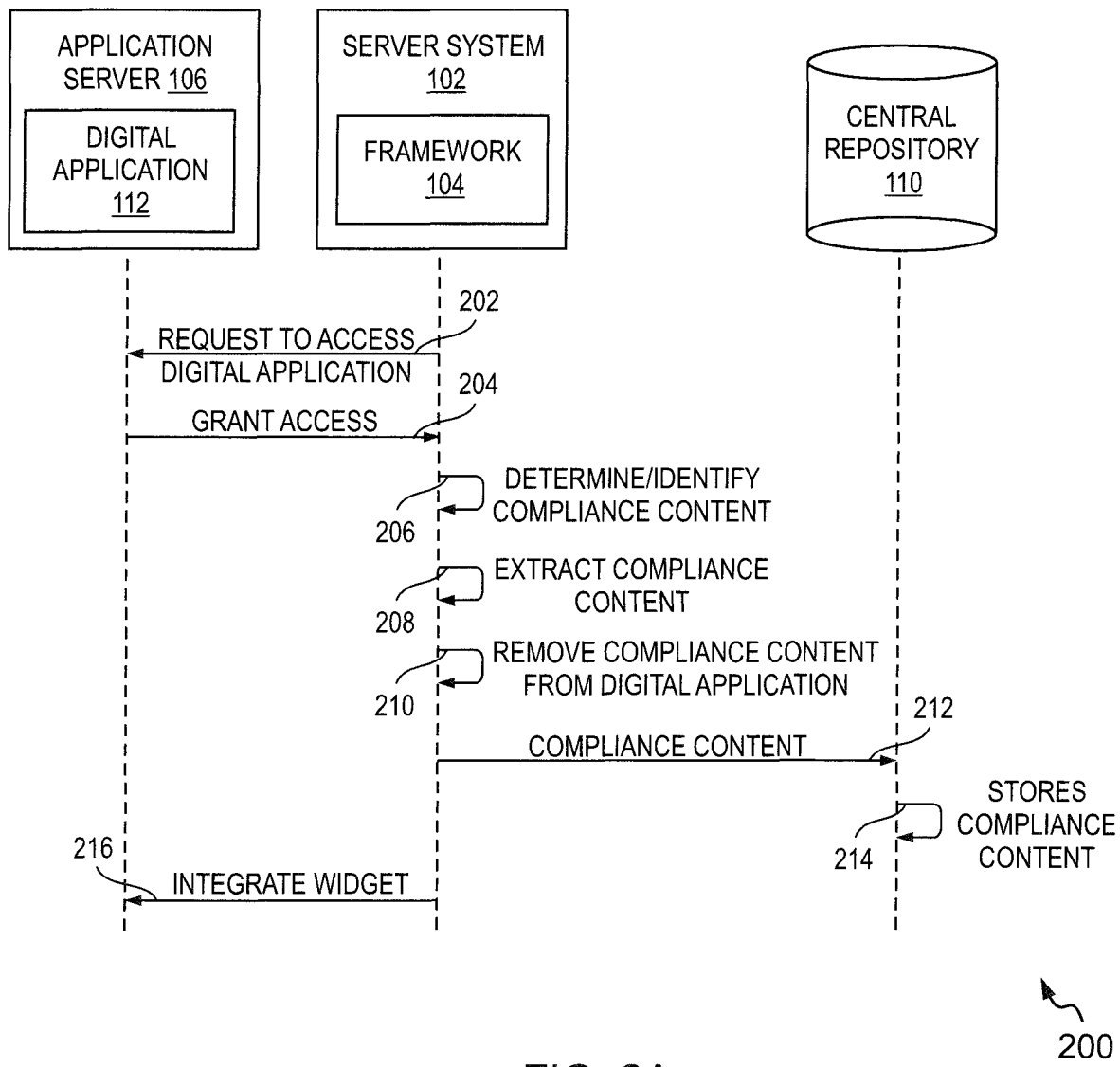
FIG. 2A is a simplified schematic flow diagram representing a method of migrating compliance content to a central repository, in accordance with an example embodiment of the present disclosure.

Referring now to FIG. 2A, a simplified schematic flow diagram illustrating a method 200 of migrating compliance content to a central repository (such as the central repository 110) is illustrated, in accordance with an example embodiment of the present disclosure. The method 200 is illustrated with the help of a digital application 112 (e.g., the digital applications 112a, 112b, 112c) among the plurality of digital applications, however, it shall be noted that the teachings of the method 200 can be extended to any number of similar digital applications. The digital application 112 is hosted and managed by an application server 106 (e.g., the digital applications 112a, 112b, 112c) and can be accessed on a plurality of user devices (e.g., the user devices 114a, 114b, 114c).

At 202, the server system 102, via the framework 104, requests access to the digital application 112. The server system 102 requests access to the pages of the digital application 112 to identify or determine the compliance content. The compliance content may be a part of a page, or in some cases an entire page or multiple pages may be examples of the compliance content. For example, compliance content, such as "terms and conditions" in any product/service subscription page, may span across multiple web pages.

At 204, the digital application 112 grants access to the pages of the digital application 112 to the server system 102. For instance, if the digital application 112 is the Masterpass® digital wallet application (hereinafter "Masterpass® application" or simply "Masterpass®"), the application server 106 managing the Masterpass® application provides access of content of the Masterpass® application to the server system 102. Herein, the content of the Masterpass® application refer to any information (e.g., text, graphics, etc.) that is normally displayed to the users (e.g., cardholder, customer, or any person including robot who access the Masterpass® application on a user device). For instance, the content includes subscription page, welcome page, various UIs including selectable options included in the Masterpass® application, payment pages, checkout pages, content related to features such as scanning images by the Masterpass® application, and the like.

At 206, the server system 102, via the framework 104, determines/identifies the compliance content from the pages of the digital application 112. The framework 104 facilitates reading of the compliance content by provisioning reading modules which can analyze (e.g., by parsing and matching texts, images and/or symbols, or by matching tags, pages types, etc.) content of the digital application 112 and make a decision whether some portions of the content of the digital application 112 relates to the compliance content or not. Some examples of the reading modules include, but are not limited to, JavaScript Object Notation (JSON) reader, a website reader, an excel sheet onboarding reader, etc., which are further described with reference to FIG. 9.

At 208, the server system 102, via the framework 104, extracts the compliance content using any techniques known in the art or to be developed in the future. For instance, in an example, the framework 104 facilitates extraction of the compliance content from the digital application 112 using a Content Repository for Java technology (JCR) extraction module, which is further described with reference to FIG. 9.

At 210, the compliance content is removed from the page(s) of the digital application 112. In some examples, a page of the digital application 112, including the compliance content, may be removed entirely from the digital application 112, if the entire page contains the compliance content.

At 212, the compliance content, or the pages of the digital application 112 comprising the compliance content, are sent to the central repository 110. The central repository 110 is a GDPR compliant repository. The central repository 110 includes a plurality of databases comprising data corresponding to compliance content associated with the digital applications similar to the digital application 112. It shall be noted that the data corresponding to compliance content includes privacy and consent language texts, images or graphic content associated with the digital applications. As such, the data which can be termed as the compliance content can be defined time to time depending upon current definitions of compliance content provided in the compliance. For example, in case of GDPR compliance, if there are changes in the types/definition of the content to be stored in the central repository 110, the framework 104 is modified accordingly to extract content as per the changes in GDPR compliance regulations.

At 214, the central repository 110 stores the compliance content. The framework 104 facilitates storing of the compliance content with relevant tags (or metadata) in the central repository 110. At 216, the method 200 further includes integrating one or more components, such as widgets in the UI of the digital application 112, which can be selected by the users to access the compliance content. A detailed flow diagram of migration of the compliance content and integration of widgets in the digital application are further described with reference to FIG. 2B.

Figure 2B:
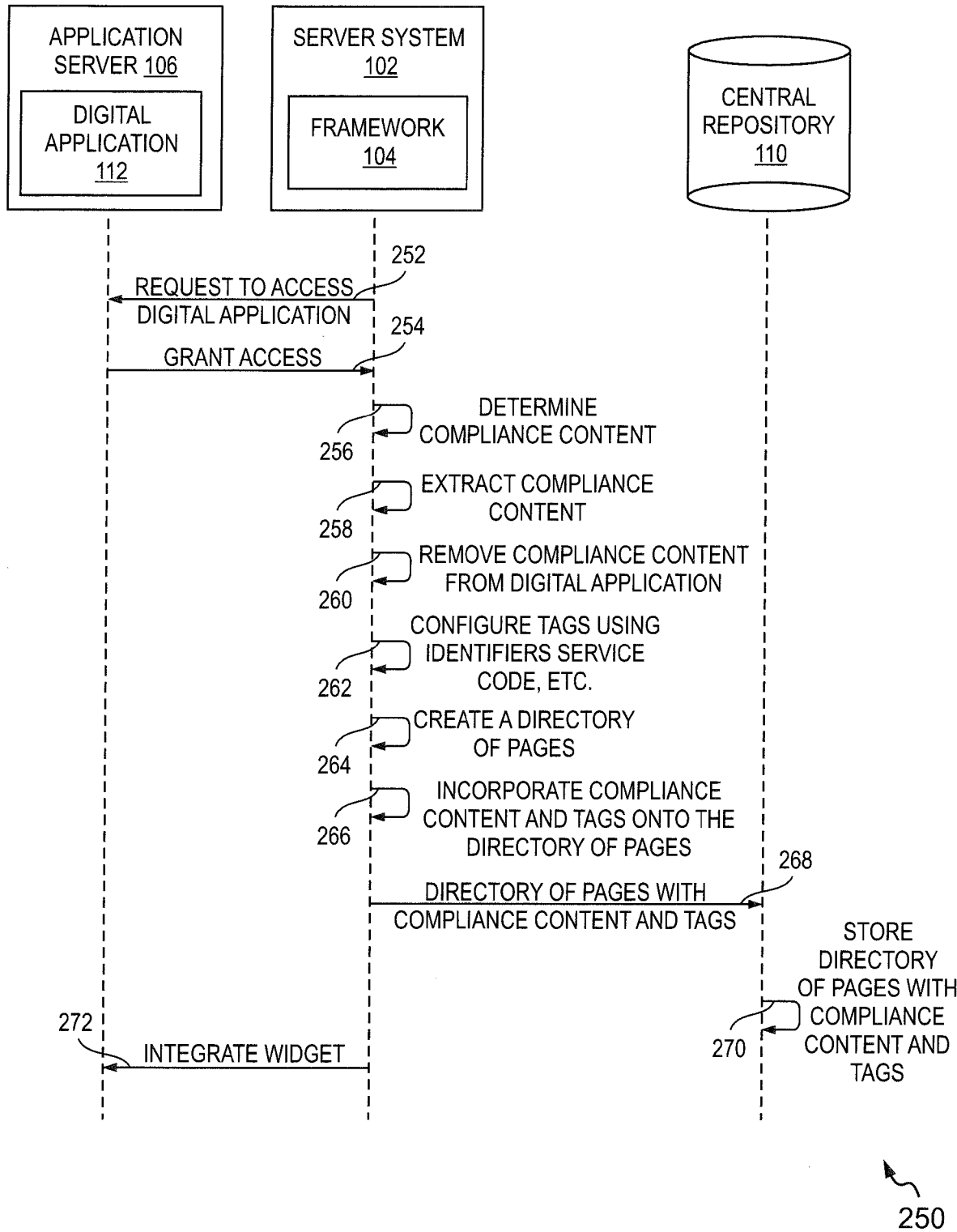
FIG. 2B is a simplified schematic flow diagram representing a method of migrating compliance content to a central repository and facilitating access to the compliance content by a plurality of digital applications from the central repository, in accordance with an example embodiment of the present disclosure.

Referring now to FIG. 2B, a simplified schematic flow diagram representing a method 250 of migrating compliance content to a central repository (such as the central repository 110) and facilitating access to the compliance content by a plurality of digital applications (such as the digital application 112) from the central repository 110 is illustrated, in accordance with an example embodiment of the present disclosure. It shall be noted that the method 250 is illustrated with the help of one digital application (such as the digital application 112) among the plurality of digital applications, however teachings of the method 250 can be extended to any number of similar digital applications. The digital application 112 is hosted and managed by the application server 106 and can be accessed on a plurality of user devices (not shown).

At 252, the server system 102, via the framework 104, requests access to the digital application 112. The server system 102 requests access to the pages of the digital application 112 to determine presence of the compliance content in the pages of the digital application 112.

At 254, the digital application 112 grants access to the pages of the digital application 112 to the server system 102.

At 256, the server system 102 determines (or identifies) the compliance content in the digital application 112. For example, the framework 104 facilitates reading of the compliance content from the digital application 112 by using modules, such as JSON reader, website reader, excel sheet onboarding reader, etc.

At 258, the server system 102 extracts the compliance content from the digital application 112. In an example, the framework 104 facilitates extraction of the compliance content by provisioning a JCR extraction module. At 260, the compliance content is removed from the pages of the digital application 112. It shall be noted that the compliance content from each page of the digital application 112 is removed. Also, if a complete page is determined as the compliance content, the entire page may be removed from the digital application 112. In at least one example embodiment, the operations 258 and 260 can be performed in a single step. For example, when the compliance content is extracted from the digital application 112, the compliance content is automatically removed from the digital application 112.

At 262, the server system 102 configures tags using one or more identifiers based on the compliance content of the digital application 112. These tags are termed as service portfolio configuration which covers various identifiers. In many scenarios, the service portfolio configuration may be pre-defined in form of one or more templates, and any of these stored templates can be used by the framework 104. Examples of the identifiers include, but are not limited to, a type of service or business, service function, content type, version of content, country of usage, language, and the like, associated with the digital application 112. For example, the identifiers may include a service code (e.g., code/name of the digital application such as 'MP' for Masterpass® application), a service function code (e.g., registration, authentication, etc.), a use category code (e.g. terms of use), content type code (e.g., legal, privacy) and a locale code (e.g., country code), among others.

At 264, the server system 102 creates a directory of pages based on the tags configured at operation 262. In an example embodiment, a single directory of pages may be created for migration of compliance content from the digital application 112. In some alternate embodiments, multiple such directory of pages may be created for a single digital application, such as the digital application 112. The directory of pages may be hierarchical in configuration, wherein initially all the pages are blank and have no content written on them. An example of the directory of pages is explained with reference to FIG. 6.

At 266, the directory of pages are incorporated (e.g., filled or populated) with the compliance content and the corresponding tags. For instance, the compliance content that is removed from the digital application 112 and the tags configured using the identifiers, are set or incorporated onto the directory of pages. It shall be noted that, one or more tags can be set on one page of the directory of pages and based on the tag, the compliance content will be set. In an example, if the compliance content includes registration data of Priceless Cities® application, it will be incorporated on the page that has a tag (e.g. 'PC-REG' shown in FIGS. 5 and 6) configured using the identifier 'service function code' set on it. Likewise, the compliance content includes country data, which will be incorporated on the page that has a tag (e.g. 'EN-AU' in FIG. 5) configured using the identifier 'locale' set on it.

At 268, the directory of pages, including the compliance content and the tags, are sent to the central repository 110. The central repository 110 is a GDPR compliant repository. At 270, the central repository 110 stores the compliance content.

At 272, the server system 102 facilitates integration of a widget into the digital application 112. The widget is associated with an API call between the digital application 112 and the central repository 110. For instance, once the widget is selected by a user accessing the digital application 112, the widget initiates the API call to fetch the compliance content stored in the central repository 110 for displaying the compliance content to the user.

Figure 3:
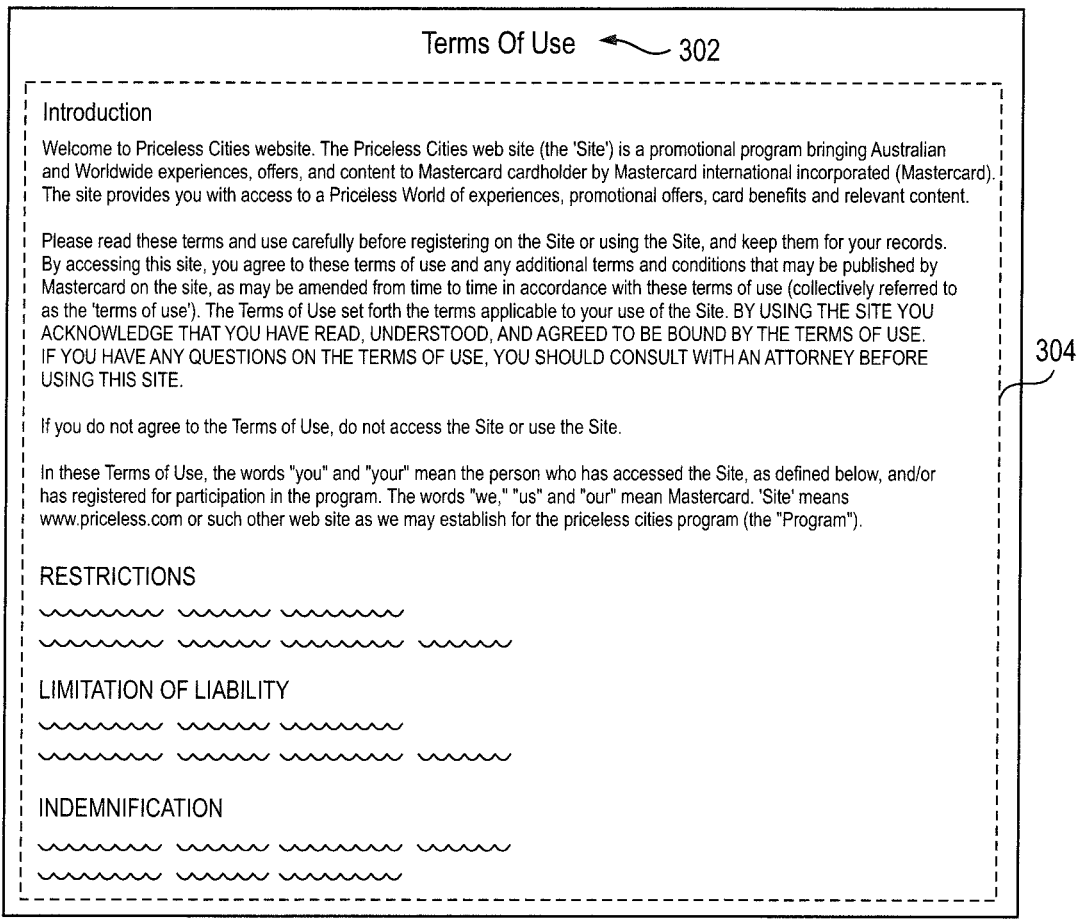
FIG. 3 is an example representation of compliance content (e.g., legal content) of a digital application, in accordance with an example embodiment of the present disclosure.
Figure 4:
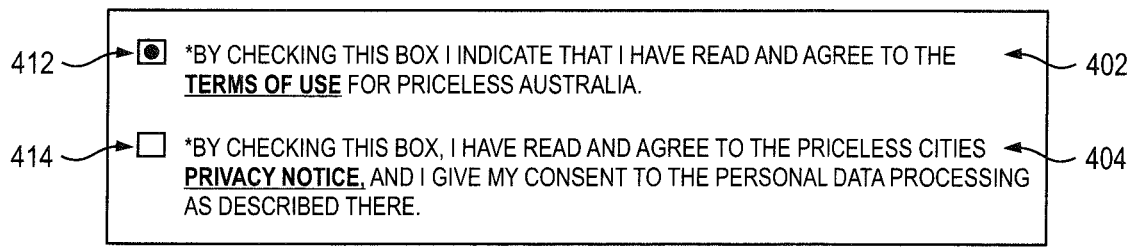
FIG. 4 is an example representation of compliance content (e.g., consent language text) of a digital application, in accordance with an example embodiment of the present disclosure.

Some examples of the compliance content are shown in FIGS. 3 and 4. FIGS. 3 and 4 are example representations 300 and 400 of the compliance content, in accordance with an example embodiment of the present disclosure. The example representations 300 and 400 are shown for an application such as Priceless Cities® application of Mastercard® International Incorporated. Without limiting to the scope of the present disclosure, the compliance content can generally be of two kinds, i.e., legal content and consent language text.

In FIG. 3, the representation 300 displays legal content including texts corresponding to "Terms of Use" of the Priceless Cities® application. The "Terms of Use" page shown in the representation 300 is for example purposes only, and it can have any suitable content. As such, the purpose of the "Terms of Use" page may be to set the rules to which users must agree to in order to use a website, mobile application and API, etc., associated with the digital application 112. The texts corresponding to "Terms of Use" may include several clauses for users and other parties. Such clauses may include, but not limited to, introduction, restrictions, limitation of liability, indemnification, etc.

In the illustrated example, the legal content is displayed in form of a heading "Terms of Use" along with other clauses (see, a portion 302) and a portion 304 including legal text under the heading 302. The framework 104 determines such language as legal content and classifies it as the compliance content. As shown in the illustrated example, the portion 304 containing the legal content is as follows:

Introduction

Welcome to Priceless Cities® website. The Priceless Cities® web site (the 'Site') is a promotional program bringing Australian and Worldwide experiences, offers, and content to Mastercard® cardholder by Mastercard® International Incorporated (Mastercard®). The site provides you with access to a Priceless World of experiences, promotional offers, card benefits and relevant content.

Please read these terms and use carefully before registering on the Site or using the Site, and keep them for your records. By accessing this site, you agree to these terms of use and any additional terms and conditions that may be published by Mastercard® on the site, as may be amended from time to time in accordance with these terms of use (collectively referred to as the 'terms of use'). The Terms of Use set forth the terms applicable to your use of the Site. BY USING THE SITE YOU ACKNOWLEDGE THAT YOU HAVE READ, UNDERSTOOD, AND AGREE TO BE BOUND BY THE TERMS OF USE. IF YOU HAVE ANY QUESTIONS ON THE TERMS OF USE, YOU SHOULD CONSULT WITH AN ATTORNEY BEFORE USING THIS SITE.

If you do not agree to the Terms of Use, do not access the Site or use the Site.

In these Terms of Use, the words "you" and "your" mean the person who has accessed the Site, as defined below, and/or has registered for participation in the program. The words "we," "us" and "our" mean Mastercard®. 'Site' means www.priceless.com or such other web site as we may establish for the priceless cities program (the "Program").

When the framework 104 accesses the digital application 112 (e.g., Priceless Cities® application) for migration of the compliance content, the framework 104 determines the compliance content present in the digital application 112. In an example, the framework 104, using the JRC extraction tool (see, a JCR extraction module 904d in FIG. 9), parses keywords/phrases, such as "Terms of Use", "Please read these terms and use carefully", "Acknowledge that you have read, understood, and agreed . . . ", "do not agree", along with other keywords. The framework 104 matches these keywords with an already known set of keywords/phrases related to the compliance content, and determines that the portions 302 and 304 are examples of the compliance content.

In FIG. 4, a representation 400 displays texts corresponding to consent language, which is also determined as an example of the compliance content. In an example, the texts corresponding to "Terms of Use" and the texts corresponding to consent language may be displayed on the same page, i.e., the texts corresponding to consent language may be displayed below the texts corresponding to "Terms of Use".

As seen in FIG. 4, the representation 400 displays two fields 402 and 404 including consent language texts. Next to the text, each field displays a checkbox (412 and 414). By checking the checkboxes 412 and 414, the user can provide his/her consent to the usage of the user's data by the digital application 112. In an example, the consent language texts (e.g., 402, 404) presented next to the checkboxes 412 and 414 are for example purposes only, and their content may be different than what is shown in FIG. 4.

The user may be allowed to check the checkboxes 412 and 414 in order to subscribe to the digital application 112. The user can check both of the checkboxes 412 and 414. As an example, the text next to the checkbox 412 reads as, "By checking this box I indicate that I have read and agree to the Terms of Use for Priceless Australia". Only checking of the checkbox 412 may not allow the digital application 112 to use and share user information unless the user has checked the checkbox 414, which reads, "By checking this box, I have read and agree to the Priceless Cities® Privacy Notice, and I give my consent to the personal data processing as described there."

When the framework 104 accesses the texts of the digital application 112 for migration of compliance content, the framework 104 parses keywords such as "I agree", "Terms of use", "My Consent", "Personal data" along with other keywords, and determines the fields 402 and 404 as part of the "consent language" which is one of the example of the compliance content.

FIG. 5 is an example representation 500 of a table including tags used for migration of compliance content of the digital application 112 to the central repository 110, in accordance with an example embodiment of present disclosure.

The representation 500 displays an example table (maintained at the server system 102) or an onboarding spreadsheet including the identifiers and the corresponding tags. As seen in FIG. 5, the table includes a column 502 that includes the identifiers in a plurality of rows (506 through 514). The table, with a certain number of rows which is the same as the number of identifiers, is shown for example purposes only. Similarly, the table includes a column 504 that includes the tags corresponding to the identifiers in the column 502 in the plurality of rows.

As an example, a row 506 of the column 502 depicts the identifier 'service code' that may define a name of the service. In an example of the digital application 112 being the Priceless Cities® application, the service code for the Priceless Cities® application can be tagged as "PC". Hence, corresponding tags exemplarily depicted as 'PC' is depicted in the row 506 of the column 504.

A row 508 of the column 502 depicts the service function code that defines a function of the service. If a page of the Priceless Cities® application relates to user registration page, the corresponding tag is exemplarily depicted as 'PC-REG' as shown in the row 508 of the column 504.

A row 510 of the column 502 depicts the use category code. In an example, if the compliance content on the page of the Priceless Cities® application relates to the "Terms of Use" (e.g., portions 302 and 304 shown in FIG. 3), the corresponding tag is exemplarily depicted as 'ToU' as shown in the row 510 of the column 504.

A row 512 of the column 502 depicts the content type code that defines a type of content, such legal content, a consent language text, privacy data, etc. The corresponding tag exemplarily depicted as 'LC' is depicted in the row 512 of the column 504.

A row 514 of the column 502 depicts the locale code that defines a country or a geographical location associated with the digital application 112, i.e., the Priceless Cities® application. In an example of compliance content of the Priceless Cities® application shown in FIG. 3, the geographical region is Australia. Hence, the country associated with the digital application 112 is 'AU' and the locale code tag is exemplarily depicted as 'EN-AU' in the row 514 of the column 504.

The table shown in FIG. 5 is only for example purposes for the explanation, and, in actual use case, the server system 102 may include multiple such tables listing many identifiers and each table may have different numbers of columns and rows than what is depicted in FIG. 5.

Figure 6:
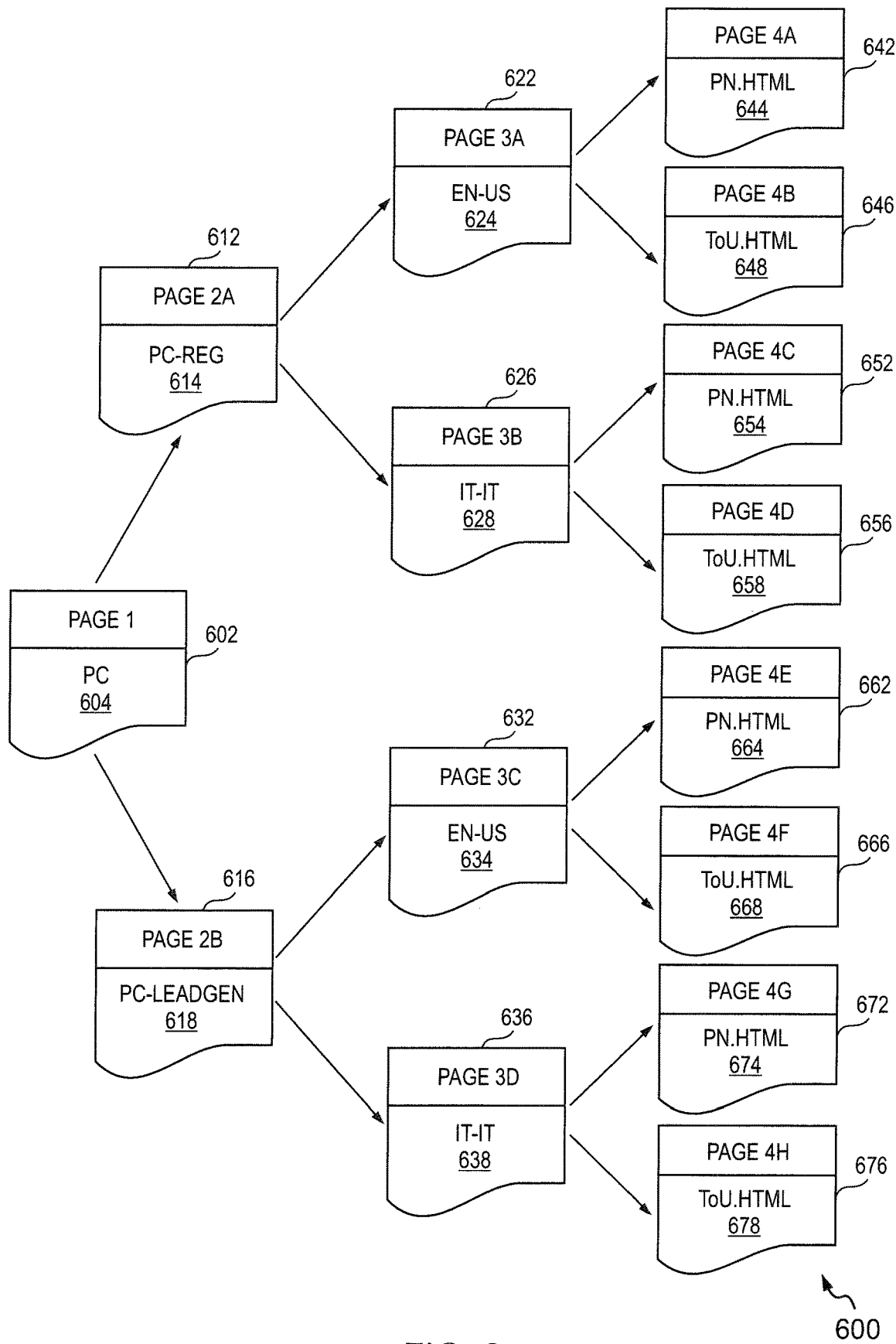
FIG. 6 is a simplified schematic representation of a directory of pages displaying tags for the digital application for migration of compliance content of the digital application to the central repository, in accordance with an example embodiment of the present disclosure.

FIG. 6 is an example representation 600 of a directory of pages displaying the identifiers and respective tags configured using the identifiers for the digital application 112, in accordance with an example embodiment of the present disclosure.

As shown in the representation 600, a top level page, i.e., page 1 (see, 602) is shown that is tagged for the relevant service code. For instance, in the example of the digital application 112 being the Priceless Cities® application, the tag for the service code is "PC" (see, 604).

Further, there may be various service function codes within the service code that may be an example of the compliance content. An example of the compliance content related to service function code, such as registration with Priceless Cities® application, is shown in page 2A (see, 612) of the hierarchical directory of pages. The tag for the registration with Priceless Cities® application is shown as PC-REG (see, 614). Another example of the compliance content related to service function codes, such as lead generation for Priceless Cities® application, is shown in page 2B (see, 616) of the hierarchical directory of pages. The tag for the registration with lead generation for Priceless Cities® application is shown as PC-LEADGEN (see, 618)

Further, the hierarchical directory of pages include pages for identifier "Locale code". In an example, each of the page 2A and page 2B may have one or more locale codes. In an example, content corresponding to the registration with the Priceless Cities® application may be displayed in "US-English" as well as in "Italian language". Hence, in the illustrated representation, a page 3A (see, 622) with tag EN-US (see, 624) for locale "US-English" is shown in the hierarchical directory of pages. Further, a page 3B (see, 626) with tag IT-IT (see, 628) for locale "Italy-Italian" is shown in the hierarchical directory of pages. In the similar manner, content corresponding to lead generation for Priceless Cities® application may be displayed in "US-English" as well as in "Italian language". Hence, in the illustrated representation, a page 3C (see, 632) with tag EN-US (see, 634) for locale "US-English", and a page 3D (see, 636) with tag IT-IT (see, 638) for locale "Italy-Italian" is shown in the hierarchical directory of pages.

Further, the hierarchical directory of pages includes pages for identifier "Use Category code". For example, individual pages for tags "PN" for privacy notice, "TC" for terms and conditions, "ToU" for Terms of Use, and "EM" for email marketing, are appropriately configured in the hierarchical directory of pages. In the illustrated representation, for each of the locale codes, pages are added for the identifier "Use Category code". For instance, a page 4A (see, 642) with tag PN.HTML (see, 644) for "privacy notice" and a page 4B (see, 646) with tag ToU.HTML (see, 648) for "Terms of Use" are added in the hierarchy structure of the page 3A. Similarly, a page 4C (see, 652) with tag PN.HTML (see, 654) for "privacy notice" and a page 4D (see, 656) with tag ToU.HTML (see, 658) for "Terms of Use" are added in the hierarchy structure of the page 3B. Similarly, a page 4E (see, 662) with tag PN.HTML (see, 664) for "privacy notice" and a page 4F (see, 666) with tag ToU.HTML (see, 668) for "Terms of Use" are added in the hierarchy structure of the page 3C, and a page 4G (see, 672) with tag PN.HTML (see, 674) for "privacy notice" and a page 4H (see, 676) with tag ToU.HTML (see, 678) for "Terms of Use" are added in the hierarchy structure of the page 3D.

In this manner, the framework 104 creates the directory of pages in the hierarchical manner, which are blank and are in the form of a spreadsheet where the compliance content can be populated. The directory of pages may include as many pages as the number of identifiers.

As described with reference to FIG. 2B, when the server system 102 extracts the compliance content and removes it from the digital application 112, the server system 102 appropriately populates the compliance content in the blank directory of pages to configure the compliance content. For example, the compliance content related to the Terms of Use (as shown in portions 302, 304 in FIG. 3) is populated in ToU.HTML (see, 648). Thereafter, the compliance content is stored in the central repository 110. Further, the server system 102 facilitates integration of a widget (best shown in FIG. 8) in the interface of the digital application 112, so that a user of the digital application 112 can readily access the compliance content. The widget is linked with the central repository 110 in the form of API calls. For instance, when the user selects the widget in any particular page of the digital application 112, such as the Priceless Cities® application, the user is presented with a pop-up window (or similar arrangement within the widget) which contains the compliance content which was removed from the digital application 112 during the process of migration of compliance content from the digital application 112 to the central repository 110.

In at least one example embodiment, the directory of pages may be stored in the form of pre-configured templates, and tags for various identifiers may be pre-configured. However, in some example embodiments, the framework 104 is configured to determine the compliance content, and can define the new tags, and new configurations of the directory of pages for migration to the central repository 110. One such example is explained with reference to FIG. 7.

Figure 7:
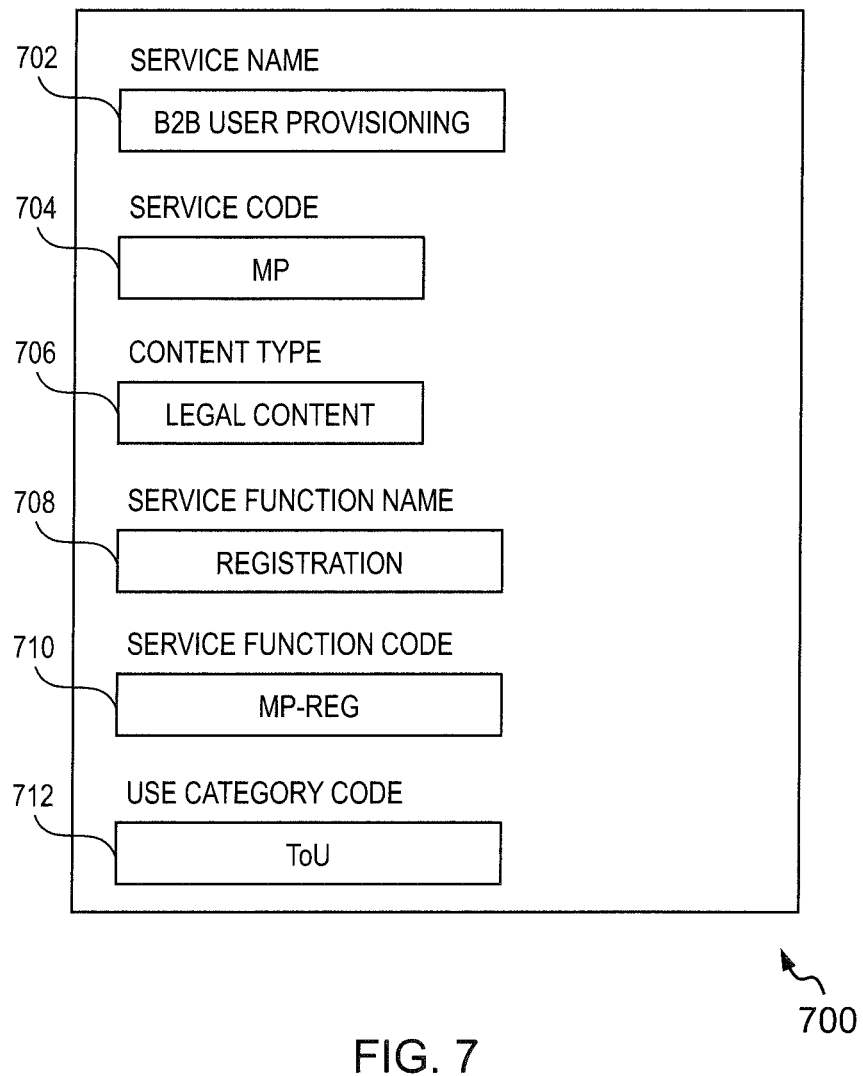
FIG. 7 is an example representation of configuring the identifiers, by the framework, in accordance with an example embodiment of the present disclosure.

FIG. 7 is an example representation 700 of configuring the identifiers, by the framework 104, in accordance with another example embodiment of the present disclosure. The framework 104 determines identifiers based on the content of the digital application 112 and configures tags using the identifiers. The identifiers, as seen in FIG. 7, are service name, service code, content type, service function name, service function code and use category code, among others. It shall be noted that the identifiers indicate the type of business or service associated with the digital application 112.

In this example representation, it is assumed that the digital application 112 is the Masterpass® wallet application. As seen in FIG. 7, fields 702, 704, 706, 708, 710 and 712 are provided below each identifier enabling the framework 104 to define the tags. As an example, the identifier service name is defined exemplarily as 'B2B user provisioning' in the field 702, the identifier service code is defined exemplarily as 'MP' in the field 704, the identifier content type is defined exemplarily as 'legal content' in the field 706, the identifier service function name is defined exemplarily as 'registration' in the field 708, the identifier service function code is defined exemplarily as 'MP-REG' in the field 710 and the identifier use category code is defined exemplarily as 'ToU' in the field 712.

An example of an UI of the digital application 112 as presented to the user is explained with reference to FIG. 8.

FIG. 8 is a representation 800 of the digital application 112 as viewed on a user device 802 of a user/customer 804, in accordance with an example embodiment of the present disclosure. The user device 802 is an example representation of the user devices (114a, 114b, 114c as shown in FIG. 1). Examples of the user device 802 include, but are not limited to, a smartphone, a tablet, a personal digital assistant (PDA), a notebook, a desktop computer, a robot, an artificial intelligence based smart device, etc. As such, the user device 802 can include any electronic devices having the capability to allow installation of third party applications or to provide access of digital applications, and having the capability to communicate with other devices via a communication network.

The representation 800 depicts a page 806 of the digital application 112 as viewed on the user device 802. The page 806 displays the information such as texts, images associated with the digital application 112. For instance, if the page 806 of the digital application 112 is a profile page of a user, the page 806 displays an image (see, 808) of the user 804 and account related information 810 provided in the profile page.

It should be noted that any form of compliance content not shown in the page 806, and a widget 812, as depicted in the FIG. 8, may be available on the digital application 112 that enables the user 804 to access the compliance content stored in the central repository 110. The widget 812 is a program or an application that redirects the user 804 of the user device 802 to an UI that displays the compliance content. In other words, the widget 812 provides a link to the central repository 110 from the digital application 112.

It shall be noted that the widget 812 is provisioned to enable display and provide access to the compliance content to the user 804. The widget 812 may be provided in any form or actionable item in the user interface (UI) of the digital application 112. Some non-exhaustive examples of the widget 812 include icons, pull-down menus, buttons, selection boxes, progress indicators, on-off checkmarks, scroll bars, windows, window edges, toggle buttons, and any other components for displaying information and for accepting user actions and responding to user actions.

The widget 812 can be configured to communicate with the central repository 110 for retrieving the compliance content from the central repository 110 and to display the compliance content upon selection of the widget 812 by the user 804. As the widget 812 is selected by the user 804, an API call is established between the digital application 112 and the central repository 110 to fetch the compliance content. In an embodiment, selection of the widget 812 may open an overlay interface on the digital application 112 where the compliance content is displayed. Additionally or alternatively, selection of the widget 812 may redirect the user 804 to the central repository 110. The framework 104 of the server system 102 can customize the configuration and representation of the widget 812 and a manner in which the widget 812 is linked with the central repository 110.

Figure 9:
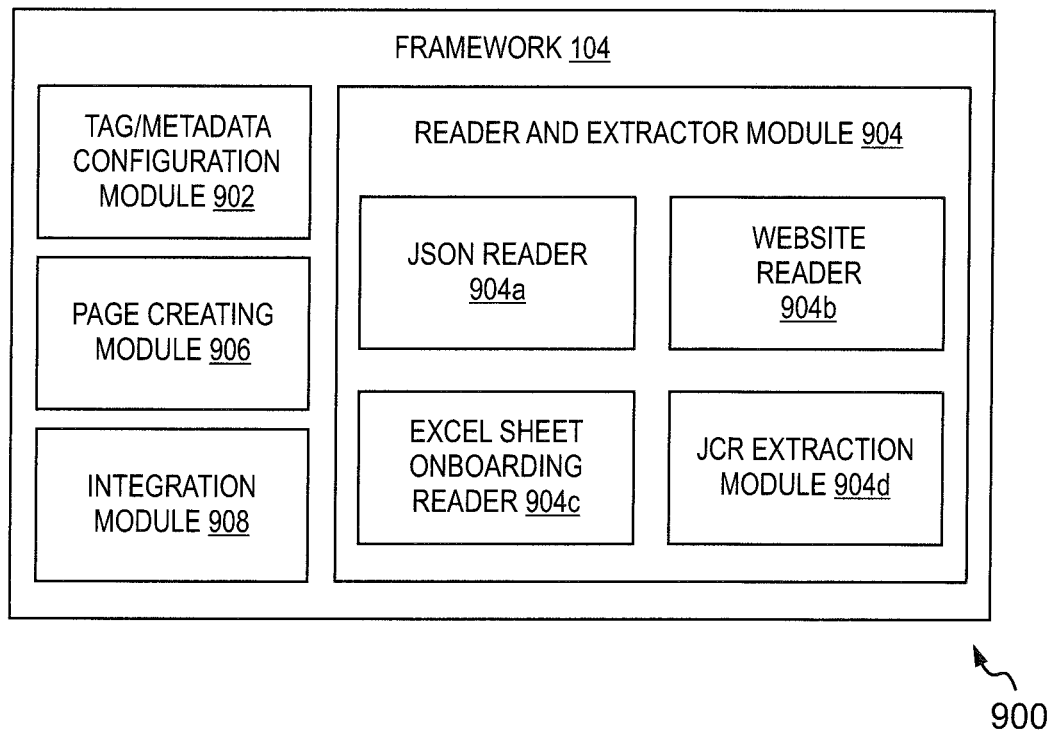
FIG. 9 illustrates a simplified block diagram showing various components of a framework of a server system, in accordance with an example embodiment of the present disclosure.

FIG. 9 includes a simplified block diagram 900 showing various components of the framework 104, in accordance with an example embodiment of the present disclosure. The framework 104 includes various sets of programs and instructions that define how each set of programs within the framework 104 interrelate. The framework 104 may include programs, programming interfaces, or programming tools for enabling workflow of the framework 104.

The framework 104 includes a tag/metadata configuration module 902, a reader and extractor module 904, a page creating module 906 and an integration module 908. The tag/metadata configuration module 902 (hereinafter 'tag configuration module 902')) uses identifiers indicating types of service or business, and configures or creates tags or metadata from the identifiers depending upon content of the pages of the digital application 112. The tag configuration module 902 uses an onboarding spreadsheet and automatically creates tag/metadata in each page of the digital application 112. These tags are termed as service portfolio configuration which covers identifiers, such as service codes, service function codes, use category codes, locale codes and content types, among others. In some example embodiments, the tag configuration module 902 can store a plurality of templates of pre-configured tags, and one or more of the templates can be selected depending upon the content of the pages of the digital application 112.

In an embodiment, the reader and extractor module 904 may be divided into two separate modules, i.e., a reader module and an extractor module. The reader and extractor module 904 may include one or more reader modules, such as a JSON reader 904a, a website reader 904b and an Excel sheet onboarding reader 904c. The JSON reader 904a is configured to read any kind of JSON object or an array structure from an input source, such as the digital application 112. The web site reader 904b may be based on any natural language processing techniques, and the Excel sheet onboarding reader 904c is configured to directly read spreadsheets or excel sheets from the digital application 112. The reader and extractor module 904 may include one or more extractor modules, such as a content extractor and web data extractor, etc. One such example of the extractor module may be a JCR extraction module 904d.

The page creating module 906 creates a directory of pages arranged in a hierarchical manner. As an example, the arrangement of the pages in a hierarchical manner may be based on the tags/metadata, such as a first page of the directory of pages including data related to service code and a subsequent page may display data related to service function code, and so on. It shall be noted that the page creating module 906 creates a directory of blank pages onto which the compliance content and the tags will be incorporated.

The integration module 908 is configured to facilitate storage of the directory of pages populated with the compliance content in the central repository 110. The integration module 908 is further configured to facilitate integration of widgets into the digital application 112. The framework 104 removes the original pages of the digital application 112 that comprised the compliance content and provides one or more widgets, which can be configured to communicate with the central repository 110 for retrieving the compliance content from the central repository 110 and display the compliance content upon selection of the widgets by a user. Selection of the widget may open an overlay interface displaying the compliance content in the digital application 112. Alternatively, selection of the widget may redirect the user to the central repository 110.

Figure 10:
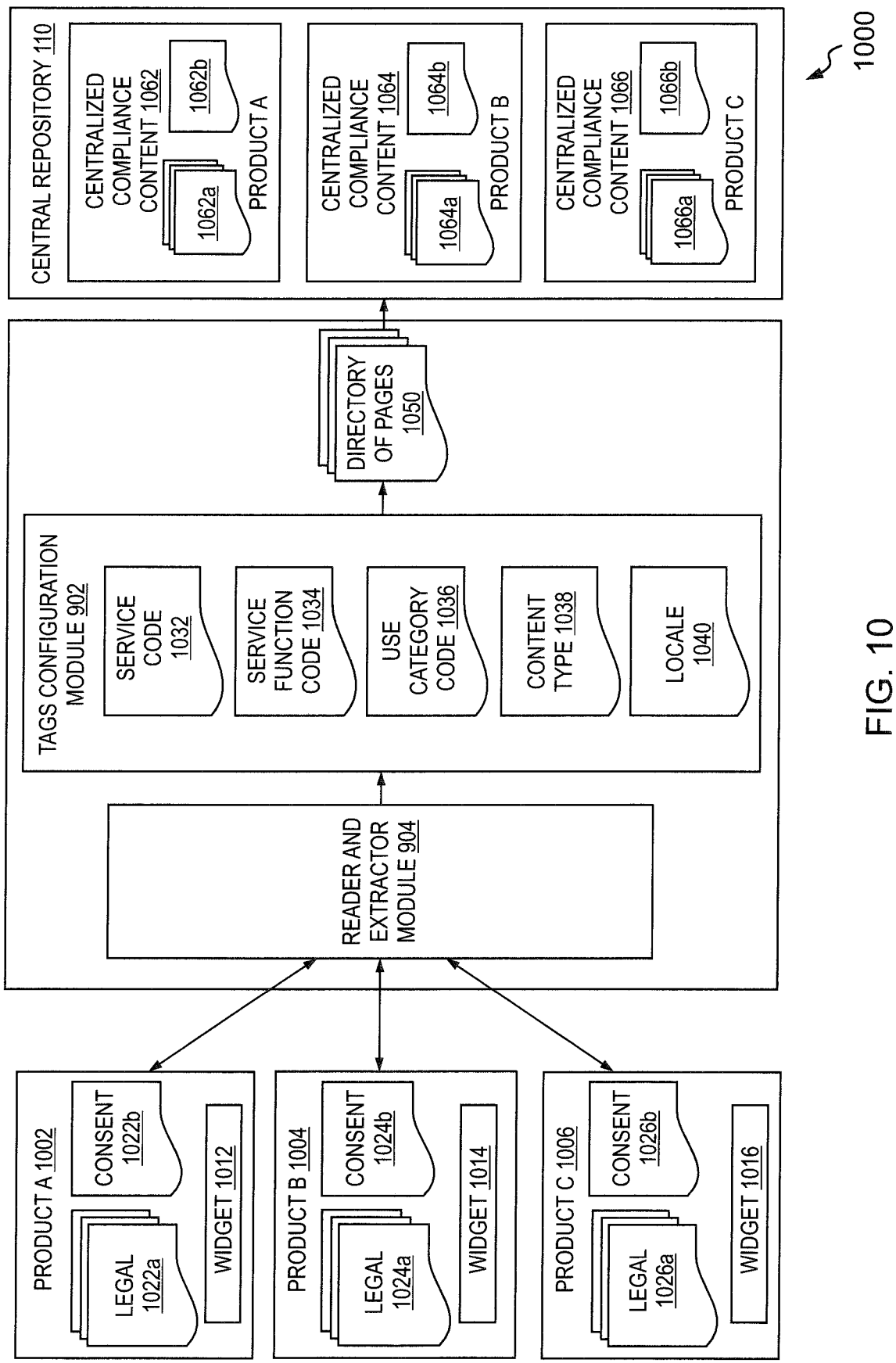
FIG. 10 illustrates a schematic representation of the system level components for migration of compliance content from a plurality of digital applications to the central repository, in accordance with an example embodiment of the present disclosure.

FIG. 10 illustrates a schematic representation 1000 of migration of compliance content from digital applications, in accordance with an example embodiment of the present disclosure. The server system 102, via the framework 104, accesses the digital applications related to products A, B and C (represented by 1002, 1004, 1006, respectively) of the organization. An example of the digital application 1002 for the product A may be a website, an example of the digital application 1004 for the product B may be a mobile application, and an example of the digital application 1006 for the product C may be a web application. These digital applications 1002-1006 may be hosted by the corresponding application servers, such as the application server 106, and can be accessed on user devices in the form of a website or a mobile or web application. The server system 102 requests the application server to access the content of any of the digital applications 1002-1006 to determine the compliance content present in the digital applications 1002-1006.

The representation 1000 depicts one or more widgets integrated into the digital applications 1002-1006. For instance, a widget 1012 is shown in the UI of the digital application 1002, a widget 1014 is shown in the UI of the digital application 1004, and a widget 1016 is shown in the UI of the digital application 1006. Examples of widgets 1012-1016 include icons, pull-down menus, buttons, selection boxes, progress indicators, on-off checkmarks, scroll bars, windows, window edges, toggle buttons, and any other devices for displaying information and for accepting user actions and responding to user actions.

Each of the digital applications 1002-1006 may have compliance content, for example, legal content and consent language text, present therein. For instance, the digital application 1002 includes legal content (see, legal 1022*a*) and consent language text (see, consent 1022*b*). Similarly, the digital application 1004 includes legal content (see, legal 1024*a*) and consent language text (see, consent 1024*b*), and the digital application 1006 includes legal content (see, legal 1026*a*) and consent language text (see, consent 1026*b*).

The server system 102, via the framework 104, determines the compliance content from the pages of digital applications, for example, from the digital application 1002. The framework 104 facilitates reading of the compliance content in the reader and extractor module 904. Example of the reader and extractor module 904 includes but not limited to a JSON reader (see, the JSON reader 904*a* in FIG. 9). The reader and extractor module 904 extracts the compliance content. In a non-limiting example, the framework 104 facilitates extraction of the compliance content by provisioning, as an example, a JCR extraction module (see, the JCR extraction module 904*d* in FIG. 9). The compliance content (e.g., the legal 1022*a* and the consent 1022*b*) is removed from the page(s) of the digital application 1002. It shall be noted that, in some instances, the page(s) of the digital application 1002, including the compliance content, may be removed completely from the digital application 1002.

The server system 102 then sends the compliance content to the tags configuration module 902 to configure tags using one or more identifiers in the compliance content. The one or more identifiers indicate at least a type of service or business offered by the entity associated with the digital application 1002. The one or more identifiers may include a service code 1032 (e.g., code for the platform), a service function code 1034 (e.g. registration, authentication, etc.), a use category code 1036 (e.g., terms of use), content type 1038 (e.g., legal, privacy) and a locale 1040 (e.g., country code), among others.

The server system 102 creates a directory of pages 1050. It shall be noted that the directory of pages 1050 thus created are hierarchical in manner. The directory of pages 1050 are blank initially and have no content written on them. The compliance content removed from the digital application 1002 and the tags configured using the identifiers are populated onto the directory of blank pages 1050. It shall be noted that, one or more tags can be set on one page of the directory of pages and based on the tags, the compliance content will be set. As an example, if the compliance content includes registration data under the legal 1022*a*, it will be incorporated on the page that has the 'service function code' tag as "REG". Likewise, if this compliance content includes country data, which will be incorporated on the page that has the tag 'locale' set on it. Some examples of the tags, identifiers, and directory of pages are described with reference to FIGS. 5 and 6.

The directory of pages 1050, including the compliance content and the tags, are sent to the central repository 110. The central repository 110 is a GDPR compliant repository. The central repository 110 stores the centralized compliance content. In the illustrated embodiment, the central repository 110 stores the centralized compliance content separately for the digital applications 1002-1006. For instance, a database (i.e., centralized compliance content 1062) is shown as storing centralized legal content (see, centralized legal 1062*a*) and centralized consent language content (see, centralized consent 1062*b*) of the digital application 1002. Similarly, a database (i.e., centralized compliance content 1064) is shown as storing centralized legal content (see, centralized legal 1064*a*) and centralized consent language content (see, centralized consent 1064*b*) of the digital application 1004. Further, a database (i.e., centralized compliance content 1066) is shown as storing centralized legal content (see, centralized legal 1066*a*) and centralized consent language content (see, centralized consent 1066*b*) of the digital application 1004.

The server system 102 facilitates integration of the widgets 1012, 1014, 1016 in the digital applications (Product A 1002, Product B 1004, and Product C 1006, respectively). The widgets 1012-1016 enable access to the compliance content stored in the central repository 110 to users accessing the digital applications (Products A-C 1002-1006). For instance, when a user selects the widget 1012, an API call is established between the digital application (Product A 1002) and the central repository 110, and the compliance content, such as relevant portions from the centralized legal content 1062*a* and the centralized consent language content 1062*b*, is displayed to the user in the UI of the digital application (Product A 1002). Hence, a technical effect of removing the compliance content from the digital applications (Products A-C 1002-1006) and storing the compliance content at the central repository 110 makes the digital applications (Products A-C 1002-1006) GDPR compliant. Further, since the compliance content of the digital applications (Products A-C 1002-1006) is stored in the central repository 110, such storage makes it easier for the users to readily access the compliance content of the digital applications (Products A-C 1002-1006).

Figure 11:
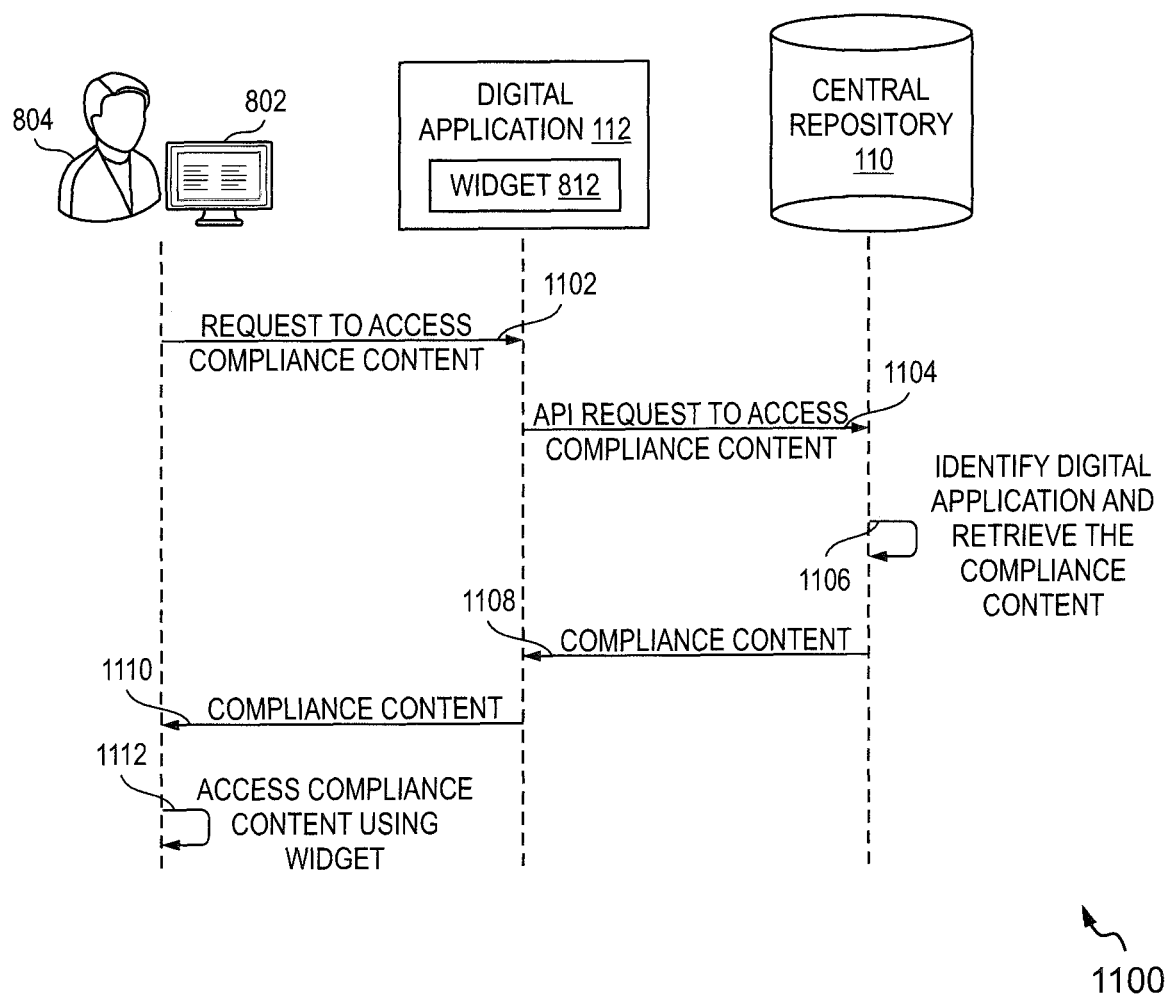
FIG. 11 is a simplified schematic flow diagram representing facilitating user access to the compliance content from the central repository, in accordance with an example embodiment of the present disclosure.

FIG. 11 is a simplified schematic flow diagram representing a method 1100 of facilitating user access to the compliance content from a central repository (such as the central repository 110), in accordance with an example embodiment of the present disclosure. It shall be noted that the method 1100 is illustrated by taking an example of a digital application (such as the digital application 112) among the plurality of digital applications. The digital application 112 is hosted and managed by the application server 106 and can be accessed on a plurality of user devices such as the user device 802 shown in FIG. 8. The digital application 112 is accessible on the user device 802 and a widget, such as the widget 812, is provisioned in the digital application 112 by the server system 102.

At 1102, the user device 802 sends a request to access the compliance content of the digital application 112. It shall be noted that a user of the user device 802 may provide a keypad input or a touch input (or any form of input mechanism, such as gesture input, voice based input, etc.) to select the widget 812 integrated into the digital application 112 displayed on the user device 802.

At 1104, the digital application 112 (or the widget 812) sends the API request to access the compliance content to the central repository 110. It shall be noted that the API request includes an identifier of the digital application 112 and details of the page on which the widget 812 is selected by the user. As described earlier, the central repository 110 is a GDPR compliant repository and stores the compliance content. The central repository 110 generally includes a plurality of databases comprising compliance content associated with various digital applications. It shall be noted that the compliance content includes legal, private, confidential and consent language texts, images or any form of graphic content, extracted from the digital applications.

At 1106, the central repository 110 identifies the digital application 112 based on the API request. As described at operation 1104 t the API request includes an identifier of the digital application 112, therefore, the central repository 110 identifies the digital application and corresponding page(s) of the digital application 112 of which the compliance content is requested by the user. At 1106, the central repository 110 retrieves the compliance content, which is GDPR compliant, associated with the digital application 112.

At 1108, the central repository 110 sends the compliance content to the digital application 112.

At 1110, the widget 812 makes the compliance content accessible to the user of the digital application 112 on the user device 802. In an example, the widget 812 expands and opens a window in which the compliance content can be shown (see, 1112). In another example, the compliance content can be overlaid on the UI of the digital application 112 as viewed on the user device 802.

Figure 12:
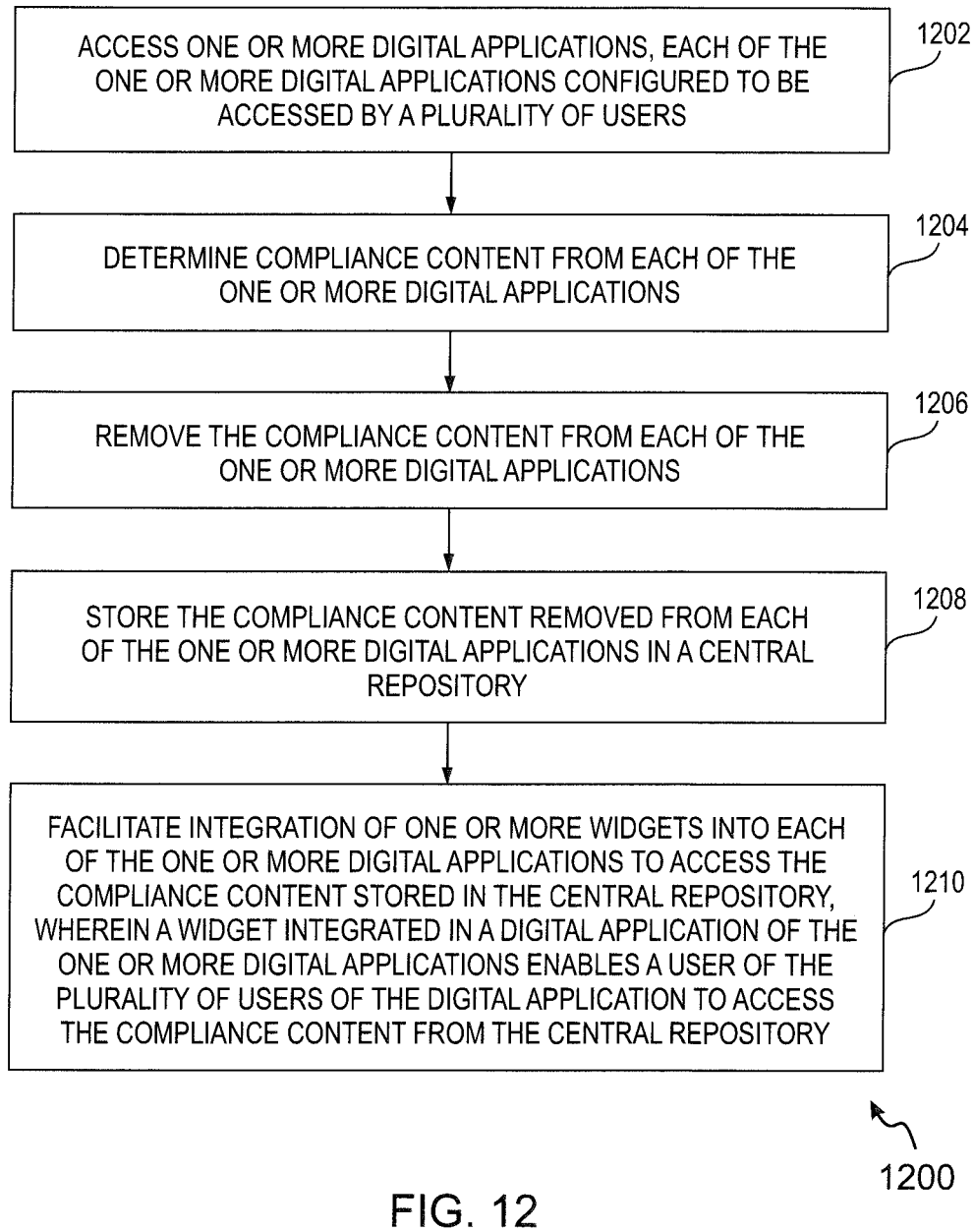
FIG. 12 illustrates a flow diagram of a method for facilitating migration to centralized compliance content for integration with one or more digital applications, in accordance with one embodiment of the present disclosure.

FIG. 12 illustrates a flow diagram of a method 1200 for facilitating migration to centralized compliance content for integration with a plurality of digital applications, in accordance with one embodiment of the present disclosure. The method 1200 depicted in the flow diagram may be executed by, for example, the server system 102. Operations of the method 1200, and combinations of operation in the method 1200, may be implemented by, for example, hardware, firmware, a processor, circuitry and/or a different device associated with the execution of software that includes one or more computer program instructions. The operations of the method 1200 are described herein with help of the server system 102. It is noted that the operations of the method 1200 can be described and/or practiced by using a system other than the server system 102. The method 1200 starts at operation 1202.

At 1202, the server system 102 accesses one or more digital applications, where each of the one or more digital applications is configured to be accessed by a plurality of users. Each of the digital applications is managed by a corresponding application server. The server system 102 communicates with the application servers to access the one or more digital applications or pages of the one or more digital applications.

At 1204, the server system 102 determines the compliance content from each of the one or more digital applications. The server system 102, via the framework 104, identifies one or more pages including the compliance content in each of the one or more digital applications.

At 1206, the server system 102 removes the compliance content from each of the one or more digital applications. The server system 102, via the framework 104, removes the compliance content from the page(s) in the one or more digital applications. The framework 104 also configures tags and creates a directory of pages in a hierarchical manner such that the compliance content removed from digital applications and the tags can be populated into the directory of pages.

At 1208, the server system 102 stores the compliance content removed from each of the digital applications in the central repository 110.

At 1210, the server system 102 facilitates integration of a widget into each of the digital applications to access the corresponding compliance content stored in the central repository 110. A widget integrated into a digital application enables a user of the digital application to access the compliance content from the central repository 110. Further, facilitating integration of a widget may refer to provisioning of widgets into the digital applications such that the widgets enable viewing of the compliance content by users of the digital applications.

In some scenarios, when a digital application, such as the digital application 112 is configured for the first time, the compliance content may not need to be removed from the digital application. In such scenarios, the compliance content of the digital application can directly be written in the central repository 110 along with the tags, and one or more widgets can be integrated in the digital application. Any user while accessing the digital application, can access the compliance content by initiating an API call by way of the one or more widgets provided in the UI of the digital application.

Figure 13:
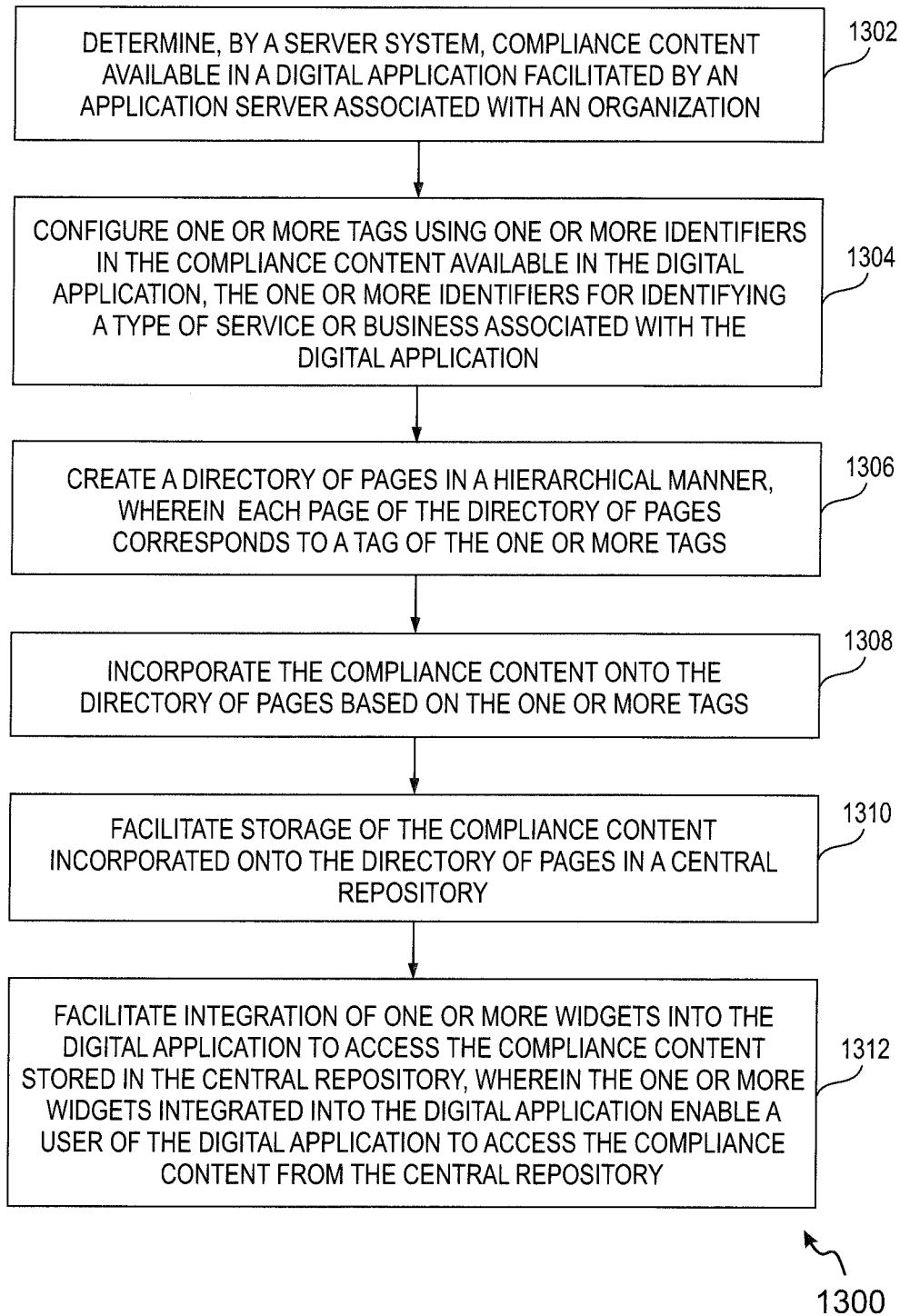
FIG. 13 illustrates another flow diagram of a method for facilitating migration to centralized compliance content for integration with one or more digital applications, in accordance with one embodiment of the present disclosure.

FIG. 13 illustrates a flow diagram of a method 1300 for facilitating migration to centralized compliance content for integration with the plurality of digital applications, in accordance with one embodiment of the present disclosure. The method 1300 depicts specific operations performed at the framework 104 by different modules of the framework 104. The method 1300 depicted in the flow diagram may be executed by, for example, the server system 102. Operations of the method 1300, and combinations of operation in the method 1300, may be implemented by, for example, hardware, firmware, a processor, circuitry and/or a different device associated with the execution of software that includes one or more computer program instructions. The operations of the method 1300 are described herein with help of the server system 102. It is noted that the operations of the method 1300 can be described and/or practiced by using a system other than the server system 102. The method 1300 starts at operation 1302.

At 1302, the server system 102 determines the compliance content available in a digital application facilitated by an application server (e.g., the application server 106) associated with an organization.

At 1304, the server system 102 configures one or more tags using one or more identifiers in the digital application. The identifiers may be examples of terms that identify the type of service or business offered through the digital application by the entity. Some examples of the tags are provided with reference to FIGS. 5 and 6.

At 1306, the server system 102 creates a directory of pages in a hierarchical manner. Each of the directory of pages corresponds to a tag of the one or more tags. The directory of pages is stored in the central repository 110 and used for storing the compliance content extracted from the digital application. An example representation of the directory of pages is explained with reference to FIG. 6.

At 1308, the server system 102 performs setting the one or more identifiers onto the directory of pages and incorporating the compliance content onto the directory of pages based at least on the one or more tags.

At 1310 and 1312, the server system 102 facilitates integration of one or more widgets into the digital application to facilitate access to the compliance content stored in the central repository 110. Herein, facilitating access refers to integrating the digital application 112 with the central repository 110 and provisioning the one or more widgets into the digital application 112 such that the widgets, if selected while browsing the digital application 112, enable viewing of the compliance content within the widgets (or in a separate window) to the users of the digital application 112.

FIG. 14 is a simplified block diagram of a server system 1400 used for facilitating migration to centralized compliance content for integration with a plurality of digital applications, in accordance with one embodiment of the present disclosure. Examples of the server system 1400 include, but are not limited to, the server system 102 illustrated in FIG. 1. The server system 1400 includes a computer system 1405 and a database 1410.

The computer system 1405 includes at least one processor 1415 for executing instructions. Instructions may be stored in, for example, but not limited to, a memory 1420. The processor 1415 may include one or more processing units (e.g., in a multi-core configuration).

The processor 1415 is operatively coupled to a communication interface 1425 such that the computer system 1405 is capable of communicating with a remote device, such as the application server 106 and the central repository 110. For example, the communication interface 1425 may receive the compliance content by accessing the digital application 112 and send the compliance content to the central repository 110 to be stored in the central repository 110.

The processor 1415 may also be operatively coupled to the database 1410. The database 1410 is any computer-operated hardware suitable for temporarily storing and/or retrieving data, such as, but not limited to, compliance content. The database 1410 may also include instructions for determining compliance content of the digital application 112, configuring tags, removing the compliance content from the digital application 112, creating the directory of pages and facilitating a widget into the digital application 112. The database 1410 may include multiple storage units, such as hard disks and/or solid-state disks in a redundant array of inexpensive disks (RAID) configuration. The database 1410 may include a storage area network (SAN) and/or a network attached storage (NAS) system.

In some embodiments, the database 1410 is integrated within the computer system 1405. For example, the computer system 1405 may include one or more hard disk drives as the database 1410. In other embodiments, the database 1410 is external to the computer system 1405 and may be accessed by the computer system 1405 using a storage interface 1430. The storage interface 1430 is any component capable of providing the processor 1415 with access to the database 1410. The storage interface 1430 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1415 with access to the database 1410.

The server system 1400 further includes a framework 1435 which is an example of the framework 104 shown in FIG. 1. The framework 1435 includes a tags configuration module 1440, a reader and extractor module 1445, a page creating module 1450 and an integration module 1455. Each of these modules and the framework 1435 are in operative communication with the processor 1415.

The configuration module 1440 uses identifiers indicating types of service or business offered by the organization through the digital application 112 and configures or creates tags or metadata from the identifiers in the pages of the digital application 112. The configuration module 1440 uses an onboarding spreadsheet and automatically creates metadata to each page of the digital application 112 in a unique manner. This metadata is termed as service portfolio configuration, which covers service codes, service function codes, use category codes, locale codes and content types, among others.

In an embodiment, the reader and extractor module 1445 may include one or more reader modules, such as a JSON module that uses human-readable text to transmit data objects consisting of attribute value pairs and array data types and website reader modules. The reader and extractor module 1445 may include one or more extractor modules, such as a content extractor and web data extractor, etc.

The page creating module 1450 creates a directory of pages arranged in a hierarchical manner. It shall be noted that the page creating module 1450 creates a directory of blank pages onto which the compliance content will be incorporated.

The integration module 1455 is configured to facilitate integration of a widget into the digital application 112. The framework 1435 removes the original pages of the digital application 112 that comprised the compliance content and provides the widget, which can be configured to display the compliance content in the widget. Compliance content removed from the digital application 112 is published and available in the widget.

FIG. 15 shows a simplified block diagram representation of a user device, such as the user device 802 seen in FIG. 8, in accordance with one embodiment of the present disclosure. The user device 802, for example, can be a desktop computer or a mobile phone capable of using the teachings of various embodiments of the present disclosure. The user device 802 is depicted to include a digital application 1506.

It should be understood that the user device 802, as illustrated and hereinafter described, is merely illustrative of one type of device and should not be taken to limit the scope of the embodiments. As such, it should be appreciated that at least some of the components described below in connection with the user device 802 may be optional and thus in an example embodiment may include more, less or different components than those described in connection with the example embodiment of FIG. 15. As such, among other examples, the user device 802 could be any of an electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 802 includes a controller or a processor 1502 (e.g., a signal processor, microprocessor, ASIC, or other control and processing logic circuitry) for performing such tasks as signal coding, data processing, image processing, input/output processing, power control, and/or other functions. An operating system 1504 controls the allocation and usage of the components of the user device 802 and support for one or more applications programs (see, digital application 1506), that implements one or more of the innovative features described herein. The digital application 1506 may include common mobile computing applications (e.g., telephony applications, email applications, calendars, contact managers, web browsers, messaging applications such as USSD messaging or SMS messaging or SIM Tool Kit (STK) application) or any other computing application.

The illustrated user device 802 includes one or more memory components, for example, a non-removable memory 1508 and/or removable memory 1510. The non-removable memory 1508 and/or removable memory 1510 may be collectively known as a database in an embodiment. The non-removable memory 1508 can include RAM, ROM, flash memory, a hard disk, or other well-known memory storage technologies. The removable memory 1510 can include flash memory, smart cards, or a Subscriber Identity Module (SIM). The one or more memory components can be used for storing data and/or code for running the operating system 1504 and the digital applications 1506. The user device 802 may further include a user identity module (UIM) 1512. The UIM 1512 may be a memory device having a processor built in. The UIM 1512 may include, for example, a subscriber identity module (SIM), a universal integrated circuit card (UICC), a universal subscriber identity module (USIM), a removable user identity module (R-UIM), or any other smart card. The UIM 1512 typically stores information elements related to a mobile subscriber. The UIM 1512, in the form of the SIM card, is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 802 can support one or more input devices 1520 and one or more output devices 1530. Examples of the input devices 1520 may include, but are not limited to, a touch screen 1522 (e.g., capable of capturing finger tap inputs, finger gesture inputs, multi-finger tap inputs, multi-finger gesture inputs, or keystroke inputs from a virtual keyboard or keypad), a microphone 1524 (e.g., capable of capturing voice input), a camera module 1526 (e.g., capable of capturing still picture images and/or video images) and a physical keyboard 1528. Examples of the output devices 1530 may include, but are not limited, to a speaker 1532 and a display 1534. Other possible output devices can include piezoelectric or other haptic output devices. Some devices can serve more than one input/output function. For example, the touch screen 1522 and the display 1534 can be combined into a single input/output device.

A wireless modem 1540 can be coupled to one or more antennas (not shown in FIG. 12) and can support two-way communications between the processor 1502 and external devices, as is well understood in the art. The wireless modem 1540 is shown generically and can include, for example, a cellular modem 1542 for communicating at long range with the mobile communication network, a Wi-Fi compatible modem 1544 for communicating at short range with an external Bluetooth-equipped device or a local wireless data network or router, and/or a Bluetooth-compatible modem 1546. The wireless modem 1540 is typically configured for communication with one or more cellular networks, such as a GSM network for data and voice communications within a single cellular network, between cellular networks, or between the user device 802 and a public switched telephone network (PSTN).

The user device 802 can further include one or more input/output ports 1550 for establishing connection with peripheral devices including a power supply 1552, one or more sensors 1554 for example, an accelerometer, a gyroscope, a compass, or an infrared proximity sensor for detecting the orientation or motion of the user device 802 and biometric sensors for scanning biometric identity of an authorized user, a transceiver 1556 (for wirelessly transmitting analog or digital signals) and/or a physical connector 1560, which can be a USB port, IEEE 1294 (FireWire) port, and/or RS-232 port. The illustrated components are not required or all-inclusive, as any of the components shown can be deleted and other components can be added.

Without in any way limiting the scope, interpretation, or application of the claims appearing below, a technical effect of one or more of the example embodiments disclosed herein is to provide computer implemented methods and server systems for facilitating migration of compliance content of a plurality of digital applications to a central repository. The system provides a server system and a framework that automate the process of migration of existing compliance content to a central repository compliant with GDPR. The framework facilitate access to the compliance content to a plurality of users accessing the plurality of digital applications by integrating widgets into the digital applications. The framework mitigates the need to migrate compliance content manually by application developers and entities. By implementing the framework, entities will be able to make their services and businesses compliant with the GDPR faster and with lesser manual effort.

The disclosed methods with reference to FIGS. 1 to 15, or one or more operations of the methods 200, 250, 1200 and 1300 may be implemented using software including computer-executable instructions stored on one or more computer-readable media (e.g., non-transitory computer-readable media, such as one or more optical media discs, volatile memory components (e.g., DRAM or SRAM)), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network, such as a cloud computing network, or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server system 1400 and its various components, such as the computer system 1405 and the database 1410, may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the present disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

With that said, and as described, it should be appreciated that one or more aspects of the present disclosure transform a general-purpose computing device into a special-purpose computing device (or computer) when configured to perform the functions, methods, and/or processes described herein. In connection therewith, in various embodiments, computer-executable instructions (or code) may be stored in memory of such computing device for execution by a processor to cause the processor to perform one or more of the functions, methods, and/or processes described herein, such that the memory is a physical, tangible, and non-transitory computer readable storage media. Such instructions often improve the efficiencies and/or performance of the processor that is performing one or more of the various operations herein. It should be appreciated that the memory may include a variety of different memories, each implemented in one or more of the operations or processes described herein. What's more, a computing device as used herein may include a single computing device or multiple computing devices.

In addition, the terminology used herein is for the purpose of describing particular exemplary embodiments only and is not intended to be limiting. As used herein, the singular forms "a," "an," and "the" may be intended to include the plural forms as well, unless the context clearly indicates otherwise. And, again, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first,"

"second," and other numerical terms when used herein do not imply a sequence or order unless clearly indicated by the context. Thus, a first feature discussed herein could be termed a second feature without departing from the teachings of the example embodiments.

It is also noted that none of the elements recited in the claims herein are intended to be a means-plus-function element within the meaning of 35 U.S.C. § 112(f) unless an element is expressly recited using the phrase "means for," or in the case of a method claim using the phrases "operation for" or "step for."

Again, the foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
   accessing, by a server system, one or more digital applications, each of the one or more digital applications configured to be accessed by a plurality of users, and each of the one or more digital applications include the compliance content therein;
   removing the compliance content from each of the one or more digital applications;
   storing the compliance content removed from each of the one or more digital applications in a central repository while maintaining an association between the compliance content and the one or more digital applications from which the compliance content was removed; and
   facilitating integration of one or more widgets into each of the one or more digital applications to access the compliance content stored in the central repository, wherein the one or more widgets integrated into a digital application of the one or more digital applications enables a user of the digital application to access the compliance content from the central repository.

2. The method as claimed in claim 1, further comprising integrating the widget with an Application Programming Interface (API) of the digital application to make an API call to the central repository.

3. The method as claimed in claim 2, further comprising:
   establishing the API call to the central repository upon selection of the one or more widgets in the digital application by the user; and
   facilitating display of the compliance content in the one or more widgets.

4. The method as claimed in claim 1, wherein the compliance content comprises at least one of: legal content or consent language texts.

5. The method as claimed in claim 1, wherein removing the compliance content comprises extracting content from each of the one or more digital applications and matching the content with a known set of keywords related to compliance content.

6. The method as claimed in claim 1, further comprising extracting the compliance content by a reader and extractor module comprising at least one of: a JavaScript Object Notation (JSON) reader; a website reader; an excel sheet onboarding reader; or a Content Repository for Java technology (JCR) extraction module.

7. The method as claimed in claim 1, wherein storing the compliance content for the digital application comprises configuring one or more tags using one or more identifiers of the compliance content, the one or more identifiers indicating at least a type of service or business associated with the digital application.

8. The method as claimed in claim 7, wherein the one or more identifiers of the compliance content comprises at least a service code, a user category code and a locale code indicating a geographical location associated with the digital application.

9. The method as claimed in claim 1, wherein storing the compliance content for the digital application further comprises:
   creating a directory of pages in a hierarchical manner, the directory of pages associated with one or more tags related to the compliance content of the digital application;
   incorporating the compliance content removed from the digital application into the directory of pages based on the one or more tags related to the compliance content; and
   storing the directory of pages incorporated with the compliance content in the central repository.

10. The method as claimed in claim 1, wherein the compliance content comprises General Data Protection Regulation (GDPR) compliance content.

11. The method of claim 1, wherein each of the one or more digital applications includes a plurality of pages, and further comprising:
    parsing the plurality of pages of the one or more digital applications to identify the compliance content prior to removal from the one or more digital applications.

12. A server system comprising:
    a memory device comprising stored instructions; and
    a processor coupled to the memory device, the processor configured to execute the stored instructions to cause the server system to:
      access one or more digital applications, each of the one or more digital applications configured to be accessed by a plurality of users, and each of the one or more digital applications including compliance content therein;
      remove the compliance content from each of the one or more digital applications;
      store the compliance content removed from each of the one or more digital applications in a central repository while maintaining an association between the compliance content and the one or more digital applications from which the compliance content was removed; and
      facilitate integration of one or more widgets into each of the one or more digital applications to access the compliance content stored in the central repository, wherein the one or more widgets integrated into a digital application of the one or more digital applications enables a user of the digital application to access the compliance content from the central repository.

13. The server system as claimed in claim 12, wherein the server system is caused to integrate the widget with an Application Programming Interface (API) of the digital application to make an API call to the central repository.

14. The server system as claimed in claim 13, wherein the processor is configured to execute the stored instructions to further cause the server system to:

establish the API call to the central repository upon selection of the one or more widgets in the digital application by the user; and facilitate display of the compliance content in the one or more widgets.

15. The server system as claimed in claim 12, wherein the compliance content comprises at least one of: legal content or consent language texts.

16. The server system as claimed in claim 12, wherein the server system is further caused, in connection with storing the compliance content removed from the digital application, to:

create a directory of pages in a hierarchical manner, the directory of pages associated with one or more tags related to the compliance content of the digital application;

incorporate the compliance content removed from the digital application into the directory of pages based on the one or more tags related to the compliance content; and store the directory of pages incorporated with the compliance content in the central repository.

17. A non-transitory computer-readable storage medium storing computer-readable instructions that, when executed by a server, causes the server to:

access one or more digital applications, each of the one or more digital applications configured to be accessed by a plurality of users, and each of the one or more digital applications including compliance content therein;

remove the compliance content from each of the one or more digital applications; and facilitate storage of the compliance content removed from each of the one or more digital applications in a central repository while maintaining an association between the compliance content and the one or more digital applications from which the compliance content was removed; and facilitate integration of one or more widgets into each of the one or more digital applications to access the compliance content stored in the central repository; wherein the one or more widgets integrated into a digital application of the one or more digital applications enables a user of the digital application to access the compliance content from the central repository.

18. The non-transitory computer-readable storage medium of claim 17, further storing computer-readable instructions that, when executed by the server, causes the server to integrate the widget by establishing an Application Programming Interface (API) of the digital application to make an API call to the central repository.

19. The non-transitory computer-readable storage medium of claim 17, further storing computer-readable instructions that, when executed by the server, causes the server to:

configure one or more tags using one or more identifiers of the compliance content, the one or more identifiers indicating at least a type of service or business associated with the digital application;

create a directory of pages in a hierarchical manner, the directory of pages associated with one or more tags related to the compliance content of the digital application; and incorporate the compliance content removed from the digital application into the directory of pages based on the one or more tags related to the compliance content, wherein the compliance content incorporated into the directory of pages is stored into the central directory.

20. The non-transitory computer-readable storage medium of claim 17, wherein the determination and removal of the compliance content is performed by at least one of: a JavaScript Object Notation (JSON) reader; a website reader; an excel sheet onboarding reader; or a Content Repository for Java technology (JCR) extraction module.

* * * * *